United States Patent
Aiba et al.

(10) Patent No.: US 9,491,753 B2
(45) Date of Patent: *Nov. 8, 2016

(54) MOBILE COMMUNICATION SYSTEM, BASE STATION APPARATUS, MOBILE STATION APPARATUS, AND MOBILE COMMUNICATION METHOD

(71) Applicant: SHARP KABUSHIKI KAISHA, Osaka-shi, Osaka (JP)

(72) Inventors: Tatsushi Aiba, Osaka (JP); Shohei Yamada, Osaka (JP)

(73) Assignee: Sharp Kabushiki Kaisha, Osaka (JP)

(\*) Notice: Subject to any disclaimer, the term of this patent is extended or adjusted under 35 U.S.C. 154(b) by 0 days.

This patent is subject to a terminal disclaimer.

(21) Appl. No.: 14/981,357

(22) Filed: Dec. 28, 2015

(65) Prior Publication Data

US 2016/0135149 A1  May 12, 2016

Related U.S. Application Data

(60) Continuation of application No. 14/267,750, filed on May 1, 2014, now Pat. No. 9,253,756, which is a division of application No. 13/378,960, filed as application No. PCT/JP2010/058526 on May 20, 2010, now Pat. No. 8,750,228.

(30) Foreign Application Priority Data

Jun. 18, 2009  (JP) ................................ 2009-144793

(51) Int. Cl.
*H04W 72/04* (2009.01)
*H04B 7/06* (2006.01)
(Continued)

(52) U.S. Cl.
CPC ......... *H04W 72/042* (2013.01); *H04B 7/0413* (2013.01); *H04B 7/0626* (2013.01);
(Continued)

(58) Field of Classification Search
CPC .. H04L 5/001; H04L 5/0053; H04W 52/146; H04W 52/367; H04W 52/60
USPC .................................................. 370/329–332
See application file for complete search history.

(56) References Cited

U.S. PATENT DOCUMENTS 6,647,003 B1  11/2003  Abeta et al.
7,852,883 B2  12/2010  Kwak et al.
(Continued)

FOREIGN PATENT DOCUMENTS

JP  2010-541465 A  12/2010
WO  WO 2004/038990 A1  5/2004
(Continued)

OTHER PUBLICATIONS

ZTE (PUCCH resource region for LTE-A, Jan. 16, 2009).*
(Continued)

*Primary Examiner* — Jae Y Lee
*Assistant Examiner* — Jean F Voltaire
(74) *Attorney, Agent, or Firm* — Birch, Stewart, Kolasch & Birch, LLP

(57) ABSTRACT

A mobile station apparatus that includes a controller that reduces transmission power in case that data is transmitted simultaneously and a transmission circuit that simultaneous transmits said data using a plurality of channels, where the plurality of channels consists of at least one physical uplink control channel and at least one physical uplink shared channel. The transmission circuit of the mobile station apparatus also transmit hybrid automatic repeat request control information on said at least one physical uplink shared channel and also transmits channel state information on said at least one physical uplink control channel.

6 Claims, 18 Drawing Sheets

(51) Int. Cl.
H04W 16/14 (2009.01)
H04B 17/336 (2015.01)
H04B 7/04 (2006.01)
H04W 72/12 (2009.01)
H04W 52/14 (2009.01)
H04W 72/02 (2009.01)
H04L 1/18 (2006.01)
H04L 5/00 (2006.01)
H04L 1/00 (2006.01)

(52) U.S. Cl.
CPC .......... *H04B 7/0632* (2013.01); *H04B 17/336* (2015.01); *H04L 1/1812* (2013.01); *H04L 5/001* (2013.01); *H04L 5/0053* (2013.01); *H04W 16/14* (2013.01); *H04W 52/146* (2013.01); *H04W 72/02* (2013.01); *H04W 72/0413* (2013.01); *H04W 72/0446* (2013.01); *H04W 72/1278* (2013.01); *H04L 1/0075* (2013.01); *H04L 5/0073* (2013.01); *Y02B 60/50* (2013.01)

(56) References Cited

U.S. PATENT DOCUMENTS

| | | |
|---|---|---|
| 2006/0268880 A1 | 11/2006 | Zhao et al. |
| 2006/0270426 A1 | 11/2006 | Marinier et al. |
| 2007/0168827 A1 | 7/2007 | Lohr et al. |
| 2009/0010213 A1 | 1/2009 | Yamada et al. |
| 2009/0201865 A1 | 8/2009 | Uemura et al. |
| 2009/0316645 A1 | 12/2009 | Uemura et al. |
| 2009/0325588 A1 | 12/2009 | Delaval |
| 2010/0035581 A1 | 2/2010 | Park et al. |
| 2010/0039953 A1 | 2/2010 | Zhang |
| 2010/0202306 A1 | 8/2010 | Jersenius et al. |
| 2010/0265901 A1 | 10/2010 | Koo et al. |
| 2010/0265905 A1 | 10/2010 | Lee et al. |
| 2010/0296460 A1 | 11/2010 | Akimoto et al. |
| 2011/0205981 A1 | 8/2011 | Koo et al. |
| 2011/0235620 A1 | 9/2011 | Ahn et al. |

FOREIGN PATENT DOCUMENTS

| | | |
|---|---|---|
| WO | WO 2008/153081 A1 | 12/2008 |
| WO | WO 2009/045139 A1 | 4/2009 |

OTHER PUBLICATIONS

ZTE-2 (Uplink Control Channel Design for LTE-A, Feb. 13, 2009).*

3GPP TSG RAN WG1 #55bis, "Some aspects of PUCCH/PUSCH transmission over multiple component carriers", LG Electronics, R1-090208, Jan. 12-16.
3GPP TSG RAN WG1 Meeting #55, "Initial Access Procedure for Asymmetric Wider Bandwidth in LTE-Advanced", NTT DOCOMO, R1-084249, Nov. 10-14, 2008.
3GPP TSG RAN WG1 meeting #55b, PUCCH resource region for LTE-A, ZTE, R1-090077, Jan. 12-16, 2009.
3GPP TSG RAN WG1 Meeting #55bis, "Considerations on DL/UL Transmissions in Asymmetric Carrier Aggregation", LG Electronics, R1-090211, Jan. 12-16, 2009.
3GPP TSG RAN WG1 Meeting#56, "Uplink Control Channel Design for LTE-Advanced", ZTE, R1-090629, Feb. 9-13, 2009.
Eurasian Search Report issued in Eurasian Patent Application No. 201171392 on Aug. 20, 2012.
European Search Report issued in European Patent Application No. 10789339.8 on Dec. 7, 2012.
LG Electronics: "PUCCH piggybacking onto PUSCH in case of transmit power limitation", 3GPP Draft; R1-090654 LTEA PUCCH Piggybacking, 3rd Generation Partnership Project (3GPP), Mobile Competence Centre; 650, Route Des Lucioles; F-06921 Sophia-Antipolis Cedex; France, No. Athens, Greece; 20090203 Feb. 3, 2009.
LGE: "Correction to the UE behavior of PUCCH CQI piggybacked on PUSCH", 3GPP Draft; R1-084657 36.213 CR0165REV1 CQI on PUSCH, 3rd Generation Partnership Project (3GPP), Mobile Competence Centre; 650, Route Des Lucioles; F-06921 Sophia-Antipolis Cedex; France, No. Prague, Czech Republic; 20081118, Nov. 18, 2008.
U.S. Notice of Allowance issued in U.S. Appl. No. 13/378,960 on Jan. 31, 2014.
U.S. Office Action issued in U.S. Appl. No. 13/378,960 on Jul. 18, 2013.
U.S. Office Action issued in U.S. Appl. No. 13/378,960 on Mar. 7, 2013.
U.S. Office Action issued in U.S. Appl. No. 13/378,960 on Sep. 20, 2012.
LG Electronics (Some aspects of PUCCH/PUSCH transmission over multiple component carriers), Jan. 12-16, 2009, 5 pages.
U.S. Office Action issued in U.S. Appl. No. 14/267,750 on Aug. 14, 2014.
U.S. Office Action issued in U.S. Appl. No. 14/267,750 on May 7, 2015.
U.S. Office Action issued in U.S. Appl. No. 14/267,750 on Sep. 29, 2015.
ZTE (Uplink Control Channel Design for L TE-A), Feb. 9-13, 2009, 5 pages.

* cited by examiner

MOBILE COMMUNICATION SYSTEM, BASE STATION APPARATUS, MOBILE STATION APPARATUS, AND MOBILE COMMUNICATION METHOD

This application is a Continuation of co-pending application Ser. No. 14/267,750 filed on May 1, 2014, which is a Divisional of Ser. No. 13/378,960 filed on Dec. 16, 2011, now U.S. Pat. No. 8,750,228-B2 issued on Jun. 10, 2014, and for which priority is claimed under 35 U.S.C. §120; application Ser. No. 13/378,960 is the national phase of PCT International Application No. PCT/JP2010/058526 filed on May 20, 2010 under 35 U.S.C. §371, which claims the benefit of priority of JP2009-144793 filed Jun. 18, 2009. The entire contents of each of the above-identified applications are hereby incorporated by reference.

TECHNICAL FIELD

The present invention relates to a mobile communication system made up of a base station apparatus and a mobile station apparatus, and a mobile communication method.

BACKGROUND ART

3GPP (3rd Generation Partnership Project) is a project for discussing/creating specifications of a mobile communication system based on a network developed from W-CDMA (Wideband-Code Division Multiple Access) and GSM (Global System for Mobile Communications). The 3GPP has standardized the W-CDMA mode as a third-generation cellular mobile communication mode and the services are sequentially started. HSDPA (High-Speed Downlink Packet Access) with higher communication speed has also been standardized and the service is started. The 3GPP is currently discussing about a mobile communication system (hereinafter referred to as "LTE-A (Long Term Evolution-Advanced)" or "Advanced-EUTRA") that utilizes the development of the third generation radio access technology (hereinafter referred to as "LTE (Long Term Evolution)" or "EUTRA (Evolved Universal Terrestrial Radio Access)") and a wider frequency band to realize faster data transmission/reception.

The OFDMA (Orthogonal Frequency Division Multiple Access) system and the SC-FDMA (Single Carrier-Frequency Division Multiple Access) system which perform user-multiplexing using subcarriers that are orthogonal to each other are discussed as communication systems in LTE. The OFDMA system that is a multi-carrier communication system is proposed for downlink, and the SC-FDMA mode that is a single-carrier communication system is proposed for uplink.

On the other hand, for communication systems in LTE-A, it is discussed to introduce the OFDMA system for downlink and the Clustered-SC-FDMA (Clustered-Single Carrier-Frequency Division Multiple Access, also referred to as DFT-s-OFDM with Spectrum Division Control) system, in addition to the SC-FDMA system, for uplink. The SC-FDMA system and the Clustered-SC-FDMA system proposed as uplink communication systems in LTE and LTE-A are characterized in that PAPR (Peak to Average Power Ratio) at the time of transmission of data (information) can be suppressed to a lower level.

While a typical mobile communication system uses a continuous frequency band, it is discussed for LTE-A to use a plurality of continuous/discontinuous frequency bands (hereinafter, referred to as "carrier elements, carrier components (CC)" or "element carriers, component carriers (CC)") in a multiple manner to implement operation as one frequency band (broad frequency band) (frequency band aggregation, also referred to as spectrum aggregation, carrier aggregation, and frequency aggregation). It is also proposed to give different frequency bandwidths to a frequency band used for downlink communication and a frequency band used for uplink communication so that a base station apparatus and a mobile station apparatus more flexibly use a wider frequency band to perform communication (asymmetric frequency band aggregation: asymmetric carrier aggregation) (Nonpatent Document 1).

FIG. 17 is a diagram for explaining frequency band aggregation in a conventional technique. Giving the same bandwidth to a frequency band used for the downlink (DL) communication and a frequency band used for the uplink (UL) communication as depicted in FIG. 17 is also referred to as symmetric frequency band aggregation (symmetric carrier aggregation). As depicted in FIG. 17, a base station apparatus and a mobile station apparatus use the plurality of carrier components that are continuous/discontinuous frequency bands in a multiple manner, thereby performing communication in a wider frequency band constituted of the plurality of carrier components. In FIG. 17, by way of example, it is depicted that a frequency band used for the downlink communication with a bandwidth of 100 MHz (hereinafter also referred to as DL system band or DL system bandwidth) is constituted of five carrier components (DCC1: Downlink Component Carrier 1, DCC2, DCC3, DCC4, and DCC5) each having a bandwidth of 20 MHz. By way of example, it is also depicted that a frequency band used for the uplink communication with a bandwidth of 100 MHz (hereinafter also referred to as UL system band or UL system bandwidth) is constituted of five carrier components (UCC1: Uplink Component Carrier 1, UCC2, UCC3, UCC4, and UCC5) each having a bandwidth of 20 MHz.

In FIG. 17, downlink channels such as a physical downlink control channel (hereinafter, PDCCH) and a physical downlink shared channel (hereinafter, PDSCH) mapped on each of the downlink carrier components. The base station apparatus uses the PDCCH to transmit to the mobile station apparatus control information (such as resource allocation information, MCS (Modulation and Coding Scheme) information, and HARQ (Hybrid Automatic Repeat Request) process information) for transmitting a downlink transport block transmitted by using the PDSCH, and uses PDSCH to transmit the downlink transport block to the mobile station apparatus. Therefore, in FIG. 17, the base station apparatus can transmit up to five downlink transport blocks to the mobile station apparatus in the same sub-frame.

Also, uplink channels such as a physical uplink control channel (hereinafter, PUCCH) and a physical uplink shared channel (hereinafter, PUSCH) mapped on each of the uplink carrier components. The mobile station apparatus uses PUCCH and/or PUSCH to transmit to the base station apparatus control information (control signals) such as HARQ control information for the physical downlink control channel and/or the downlink transport blocks, channel state information, and scheduling requests. The HARQ control information is information indicative of ACK/NACK (Positive Acknowledgement/Negative Acknowledgement, ACK signal or NACK signal) and/or information indicative of DTX (Discontinuous Transmission) for the physical downlink control channel and/or the downlink transport blocks. The information indicative DTX is information indicating that the mobile station apparatus cannot detect the PDCCH from the base station apparatus. In FIG.

17, any of downlink/uplink channels such as the PDCCH, the PDSCH, the PUCCH, and the PUSCH may not be mapped on some downlink/uplink carrier components.

Similarly, FIG. 18 is a diagram for explaining asymmetric frequency band aggregation (asymmetric carrier aggregation) in a conventional technique. As depicted in FIG. 18, the base station apparatus and the mobile station apparatus give different bandwidths to a frequency band used for the downlink communication and a frequency band used for the uplink communication, and use the carrier components constitute these frequency bands in a multiple manner, thereby performing communication in a wider frequency band. In FIG. 18, by way of example, it is depicted that a frequency band used for the downlink communication with a bandwidth of 100 MHz is constituted of five carrier components (DCC1, DCC2, DCC3, DCC4, and DCC5) each having a bandwidth of 20 MHz, and that a frequency band used for the uplink communication with a bandwidth of 40 MHz is constituted of two carrier components (UCC1 and DCC2) each having a bandwidth of 20 MHz. In FIG. 18, the downlink/uplink channels are mapped on each of the downlink/uplink carrier components, and the base station apparatus uses the plurality of PDSCHs allocated by the plurality of PDCCHs to transmit the plurality of downlink transport blocks in the same sub-frame to the mobile station apparatus. The mobile station apparatus uses the PUCCH and/or the PUSCH to transmit the control information (the control signals) such as the HARQ control information, the channel state information, and the scheduling requests, to the base station apparatus.

PRIOR ART DOCUMENT

Nonpatent Document

Nonpatent Document 1: "Initial Access Procedure for Asymmetric Wider Bandwidth in LTE-Advanced", 3GPP TSG RAN WG1 Meeting #55, R1-084249, Nov. 10-14, 2008.

SUMMARY OF THE INVENTION

Problem to be Solved by the Invention

However, in a conventional technique, it is problematic that the mobile station apparatus is unable to transmit the data (information) to the base station apparatus by using the PUSCH and the PUCCH in the same sub-frame (simultaneous transmission of the PUSCH and the PUCCH), to transmit the data to the base station apparatus by using the plurality of PUSCHs in the same sub-frame (simultaneous transmission of the plurality of PUSCHs), and to transmit the data to the base station apparatus by using the plurality of PUCCHs in the same sub-frame (simultaneous transmission of the plurality of PUCCHs).

On the other hand, LTE-A enables the mobile station apparatus to transmit the data to the base station apparatus with transmission power (PAPR: Peak to Average Power Ratio) higher than conventional cases since the mobile station apparatus performs the data transmission using the plurality of uplink carrier components. However, since it is also important that the mobile station apparatus suppresses transmission power low to some extent when transmitting the data, LTE-A needs a data transmitting method using the plurality of PUSCHs and/or PUCCHs in consideration of transmission power in a mobile station apparatus.

The present invention was conceived in view of the situations and it is therefore a purpose of the present invention to provide a mobile communication system and a mobile communication method capable of the data transmission using the plurality of PUSCHs and/or PUCCHs with transmission power in the mobile station apparatus suppressed to a lower level when the base station apparatus and the mobile station apparatus use the carrier components in a multiple manner to perform communication in a wider frequency band.

Means for Solving the Problem (1) To accomplish the above purpose, the present invention uses the following means. A base station apparatus of the present invention is a base station apparatus receiving uplink control information from a mobile station apparatus, comprising: a means for receiving, from the mobile station apparatus, channel state information on a first physical uplink control channel if the uplink control information transmitted by the mobile station apparatus consists only of the channel state information in a sub-frame; a means for receiving, from the mobile station apparatus, HARQ control information on a second physical uplink control channel if the uplink control information transmitted by the mobile station apparatus consists only of the HARQ control information in a sub-frame; and a means for receiving, from the mobile station apparatus, the channel state information on a physical uplink shared channel and the HARQ control information on the second physical uplink control channel if the uplink control information transmitted by the mobile station apparatus consists of the channel state information and the HARQ control information in a sub-frame in which the physical uplink shared channel is being transmitted.

(2) Further, a mobile station apparatus of the present invention is a mobile station apparatus transmitting uplink control information to a base station apparatus, comprising: a means for transmitting, to the base station apparatus, channel state information on a first physical uplink control channel if the uplink control information transmitted to the base station apparatus consists only of the channel state information in a sub-frame; a means for transmitting, to the base station apparatus, HARQ control information on a second physical uplink control channel if the uplink control information transmitted to the base station apparatus consists only of the HARQ control information in a sub-frame; and a means for transmitting, to the base station apparatus, the channel state information on a physical uplink shared channel and the HARQ control information on the second physical uplink control channel if the uplink control information transmitted to the base station apparatus consists of the channel state information and the HARQ control information in a sub-frame in which the physical uplink shared channel is being transmitted.

(3) Further, a communication method of the present invention is a communication method of a base station apparatus receiving uplink control information from a mobile station apparatus, comprising: receiving, from the mobile station apparatus, channel state information on a first physical uplink control channel if the uplink control information transmitted by the mobile station apparatus consists only of the channel state information in a sub-frame; receiving, from the mobile station apparatus, HARQ control information on a second physical uplink control channel if the uplink control information transmitted by the mobile station apparatus consists only of the HARQ control information in a sub-frame; and receiving, from the mobile station apparatus, the channel state information on a physical uplink shared channel and the HARQ control information on the second physical uplink control channel if the uplink control information transmitted by the mobile station apparatus consists of the channel state information and the HARQ control information in a sub-frame in which the physical uplink shared channel is being transmitted.

(4) Further, a communication method of the present invention is a communication method of a mobile station apparatus transmitting uplink control information to a base station apparatus, comprising: transmitting, to the base station apparatus, channel state information on a first physical uplink control channel if the uplink control information transmitted to the base station apparatus consists only of the channel state information in a sub-frame; transmitting, to the base station apparatus, HARQ control information on a second physical uplink control channel if the uplink control information transmitted to the base station apparatus consists only of the HARQ control information in a sub-frame; and transmitting, to the base station apparatus, the channel state information on a physical uplink shared channel and the HARQ control information on the second physical uplink control channel if the uplink control information transmitted to the base station apparatus consists of the channel state information and the HARQ control information in a sub-frame in which the physical uplink shared channel is being transmitted.

Effect of the Invention

The present invention enables information transmission/reception using the plurality of PUSCHs and/or PUCCHs with transmission power in the mobile station apparatus suppressed to a lower level when the base station apparatus and the mobile station apparatus uses the plurality of continuous/discontinuous frequency bands (the carrier components) in a multiple manner to perform communication in a wider frequency band.

MODES FOR CARRYING OUT THE INVENTION

Figure 1:
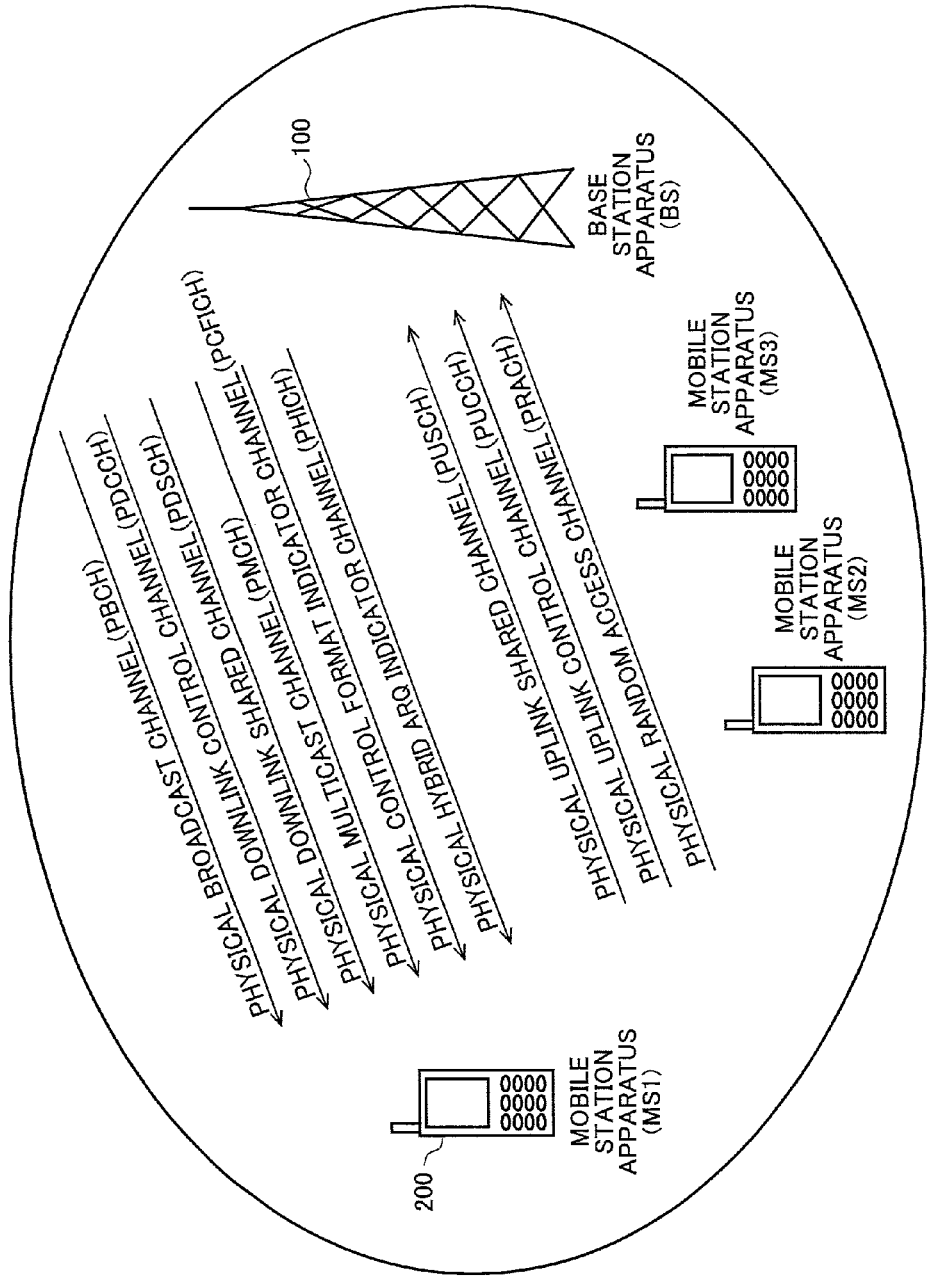
FIG. 1 is a conceptual diagram of a configuration of physical channels according to an embodiment of the present invention.

Embodiments according to the present invention will now be described with reference to the drawings. FIG. 1 is a diagram of one exemplary configuration of channels of an embodiment of the present invention. Downlink physical channels are constituted of a physical broadcast channel (PBCH), a physical downlink control channel (PDCCH), a physical downlink shared channel (PDSCH), a physical multicast channel (PMCH), a physical control format indicator channel (PCFICH), and a physical hybrid ARQ indicator channel (PHICH). Uplink physical channels are constituted of a physical uplink shared channel (PUSCH), a physical uplink control channel (PUCCH), and a physical random access channel (PRACH).

The physical broadcast channel (PBCH) maps the broadcast channel (BCH) at intervals of 40 milliseconds. Blind detection is performed for the timing of 40 milliseconds. Therefore, explicit signaling is not performed for the presentation of the timing. A sub-frame including the physical broadcast channel (PBCH) can be decoded by itself (self-decodable).

The physical downlink control channel (PDCCH) is a channel used for notifying (transmitting to) the mobile station apparatus of the resource allocation of the physical downlink shared channel (PDSCH), the hybrid automatic repeat request (HARQ) information for the downlink data, and an uplink transmission permission that is the resource allocation of the physical uplink shared channel (PUSCH). The PDDCH is constituted of a plurality of control channel elements (CCE), and the mobile station apparatus detects the PDCCH constituted of CCEs to receive the PDCCH from the base station apparatus. The CCE is constituted of a plurality of resource element groups (REG, also referred as mini-CCE) distributed in frequency and time domains. A resource element is a unit resource constituted of one OFDM symbol (time domain) and one sub-carrier (frequency domain) and, for example, the REG is constituted of four downlink resource elements consecutive in the frequency domain, except the downlink pilot channel, in the frequency domain in the same OFDM symbol. For example, one PDCCH is constituted of one, two, four, and eight CCEs having the consecutive numbers identifying CCEs (CCE index).

The PDCCH is separately coded (separate coding is applied) by each mobile station apparatus and by each type. Therefore, the mobile station apparatus detects the plurality of PDCCHs and acquires the downlink or uplink resource allocation and the information indicative of other control signals. A value of CRC (cyclic redundancy check) enabling format identification is added to each PDCCH and the mobile station apparatus performs CRC for each set of CCEs that may constitute the PDCCH and acquires the PDCCH of successful CEC. This is referred to as blind decoding and, with regard to a set of CCEs that may constitute the PDCCH which the blind decoding is performed, the range thereof is referred to as a search space. Therefore, the mobile station apparatus performs the blind decoding for CCEs in the search space to detect the PDCCH.

If the PDCCH includes resource allocation of the physical downlink shared channel (PDSCH), the mobile station apparatus uses the physical downlink shared channel (PDSCH) to receive the data (downlink data (downlink shared channel (DL-SCH)), and/or the downlink control data (the downlink control information)) in accordance with the resource allocation specified by the PDCCH from the base station apparatus. Therefore, the PDCCH is used for transmitting a signal that performs resource allocation to downlink (hereinafter referred to as "a downlink transmission permission signal" or "a downlink grant"). If the PDCCH includes resource allocation of the physical uplink shared channel (PUSCH), the mobile station apparatus uses the physical uplink shared channel (PUSCH) to transmit the data (uplink data (uplink shared channel (UL-SCH)), and/or the uplink control data (the uplink control information)) in accordance with the resource allocation specified by the PDCCH from the base station apparatus. Therefore, the PDCCH is used for transmitting a signal that permits data transmission to uplink (hereinafter referred to as "an uplink transmission permission signal" or "an uplink grant").

The physical downlink shared channel (PDSCH) is a channel used for transmitting the downlink data (downlink shared channel: DL-SCH) or paging information (paging channel: PCH). The physical multicast channel (PMCH) is a channel utilized for transmitting a multicast channel (MCH), and a downlink reference signal, an uplink reference signal, and a physical downlink synchronization signal are separately mapped.

The transmission of the downlink data (the DL-SCH) indicates transmission of user data, for example, and the DL-SCH is a transport channel. The DL-SCH supports HARQ and dynamic adaptive radio link control, and can utilize the beamforming. The DL-SCH supports dynamic resource allocation and quasi-static resource allocation.

The physical uplink shared channel (PUSCH) is a channel mainly used for transmitting the uplink data (uplink shared channel: UL-SCH). If the base station apparatus schedules the mobile station apparatus, the control information (the control signal) is also transmitted by using the PUSCH. This control information consists of the channel state information (CSI) (channel state information or channel statistical information) indicative of a downlink channel state, a downlink channel quality indicator (CQI), a precoding matrix indicator (PMI), a rank indicator (RI), and the HARQ control information for the PDCCH and/or the downlink transport blocks (the information indicative of ACK/NACK and/or the information indicative of DTX). The channel state information (CSI) consists of, for example, explicit channel state information (Explicit CSI), which is a downlink channel state itself measured by a mobile station apparatus (a measured downlink channel state represented by a proper factor etc.). the CQI, the PMI, the RI, etc., are also referred to as implicit channel state information (Implicit CSI).

The transmission of the uplink data (the UL-SCH) indicates transmission of user data, for example, and the UL-SCH is a transport channel. The UL-SCH supports HARQ and dynamic adaptive radio link control, and can utilize the beamforming. The UL-SCH supports dynamic resource allocation and quasi-static resource allocation.

The uplink data (the UL-SCH) and the downlink data (the DL-SCH) may include radio resource control signals exchanged between the base station apparatus and the mobile station apparatus (hereinafter referred to as "RRC signaling: Radio Resource Control Signaling"), MAC (Medium Access Control) control elements, etc.

The physical uplink control channel (PUCCH) is a channel used for transmitting the control information (the control signal). The control information consists of, for example, the channel state information (CSI), the downlink channel quality indicator (CQI), the precoding matrix indicator (PMI), and the rank indicator (RI) transmitted (fed back) from the mobile station apparatus to the base station apparatus, the scheduling request (SR) that requests resource allocation for transmission of the uplink data by the mobile station apparatus (that requests transmission on the UL-SCH), and the HARQ control information for the PDCCH and/or the downlink transport blocks (the information indicative of ACK/NACK and/or the information indicative of DTX).

The physical control format indicator channel (PCFICH) is a channel utilized for notifying the mobile station apparatus of the number of OFDM symbols used for the PDCCH and is transmitted in sub-frames. The physical hybrid ARQ indicator channel (PHICH) is a channel utilized for transmitting ACK/NACK used for HARQ of the uplink data. The physical random access channel (PRACH) is a channel used for transmitting a random access preamble and has a guard time. As depicted in FIG. 1, a mobile communication system according to this embodiment is made up of a base station apparatus 100 and mobile station apparatuses 200.

Configuration of Base Station Apparatus

Figure 2:
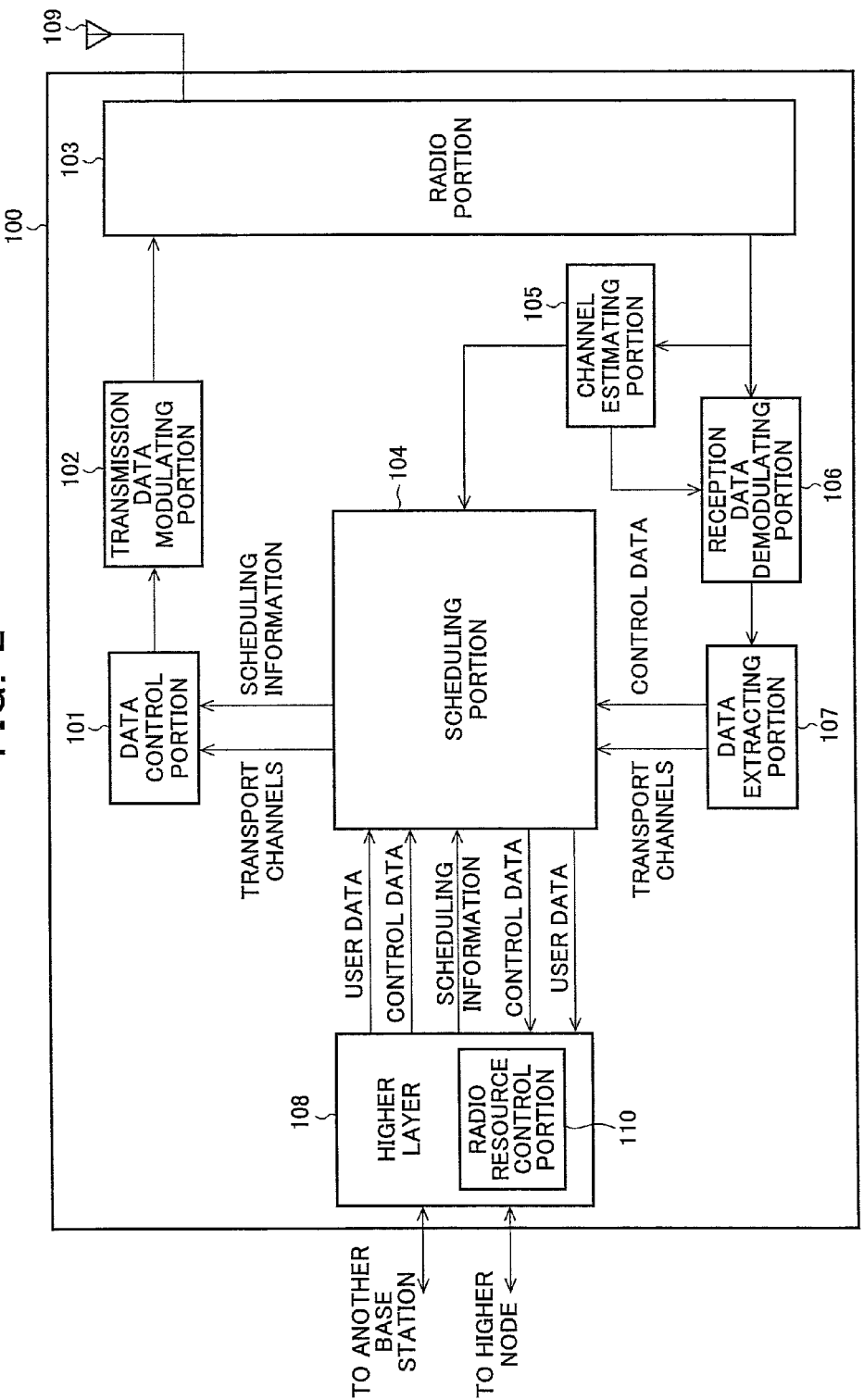
FIG. 2 is a block diagram of a general configuration of a base station apparatus 100 according to the embodiment of the present invention.

FIG. 2 is a block diagram of a general configuration of the base station apparatus 100 according to an embodiment of the present invention. The base station apparatus 100 includes a data control portion 101, a transmission data modulating portion 102, a radio portion 103, a scheduling portion 104, a channel estimating portion 105, a reception data demodulating portion 106, a data extracting portion 107, a higher layer 108, and an antenna 109. A receiving portion is made up of the radio portion 103, the scheduling portion 104, the channel estimating portion 105, the reception data demodulating portion 106, the data extracting portion 107, the higher layer 108, and the antenna 109, and a transmitting portion is made up of the data control portion 101, the transmission data modulating portion 102, the radio portion 103, the scheduling portion 104, the higher layer 108, and the antenna 109.

The antenna 109, the radio portion 103, the channel estimating portion 105, the reception data demodulating portion 106, and the data extracting portion 107 execute processes of an uplink physical layer. The antenna 109, the radio portion 103, the transmission data modulating portion 102, and the data control portion 101 execute processes of a downlink physical layer.

The data control portion 101 receives the transport channels from the scheduling portion 104. The data control portion 101 maps the transport channels as well as signals and channels generated in the physical layer to the physical channels based on the scheduling information input from the scheduling portion 104. The data mapped as described above are output to the transmission data modulating portion 102.

The transmission data modulating portion 102 modulates transmission data into the OFDM mode. The transmission data modulating portion 102 executes signal processes on the data input from the data control portion 101 such as data modulation, encoding, input signal serial/parallel conversion, the IFFT (Inverse Fast Fourier Transform) process, CP (cyclic prefix) insertion, and filtering based on the scheduling information from the scheduling portion 104 and a modulation mode and a coding mode corresponding to PRBs, generates transmission data and outputs that data to the radio portion 103. The scheduling information includes downlink physical resource block PRB allocation information, for example, physical resource block position information made up of frequency and time, and the modulating scheme and the coding scheme corresponding to PRBs include information such as a modulating scheme: 16 QAM and a coding rate: ⅔ coding rate, for example.

The radio portion 103 up-converts the modulated data input from the transmission data modulating portion 102 to a radio frequency to generate and transmit a radio signal via the antenna 109 to the mobile station apparatus 200. The radio portion 103 receives an uplink radio signal from the mobile station apparatus 200 via the antenna 109 and down-converts the signal to a baseband signal to output the reception data to the channel estimating portion 105 and the reception data demodulating portion 106.

The scheduling portion 104 executes a process of a medium access control (MAC) layer. The scheduling portion 104 performs the mapping of the logical channels and the transport channels, the scheduling of downlink and uplink (such as HARQ process and selection of transport format), etc. Since the scheduling portion 104 integrally controls the processing portions of the physical layers, interfaces exist between the scheduling portion 104 and the antenna 109, the radio portion 103, the channel estimating portion 105, the reception data demodulating portion 106, the data control portion 101, the transmission data modulating portion 102, and the data extracting portion 107 (although not depicted).

In the downlink scheduling, the scheduling portion 104 executes the selection process of a downlink transport format for modulating data (transmission form, i.e., allocation of physical resource blocks and a modulating scheme and a coding scheme), the retransmission control of HARQ, and generates the scheduling information used in downlink, based on feedback information received from the mobile station apparatus 200 (uplink channel state information (CQI, PMI, RI) and ACK/NACK information for downlink data), the information of usable PRB of the mobile station apparatuses, a buffer status, the scheduling information input from the higher layer 108, etc. The scheduling information used for the downlink scheduling is output to the data control portion 101.

In the uplink scheduling, the scheduling portion 104 executes the selection process of an uplink transport format for modulating data (transmission form, i.e., allocation of physical resource blocks and a modulating scheme and a coding scheme) and generates the scheduling information used in the uplink scheduling, based on an estimation result of an uplink channel state (radio propagation channel state) output by the channel estimating portion 105, a resource allocation request from the mobile station apparatus 200, information of usable PRB of the mobile station apparatuses 200, the scheduling information input from the higher layer 108, etc. The scheduling information used for the uplink scheduling is output to the data control portion 101.

The scheduling portion 104 maps the downlink logical channels input from the higher layer 108 to the transport channels before output to the data control portion 101. The scheduling portion 104 processes the control data acquired through the uplink and the transport channels input from the data extracting portion 107 as needed and maps the control data and the transport channels to the uplink logical channels before output to the higher layer 108.

The channel estimating portion 105 estimates an uplink channel state from an uplink demodulation reference signal (DRS) for the demodulation of uplink data and outputs the estimation result to the reception data demodulating portion 106. The channel estimating portion 105 also estimates an uplink channel state from an uplink sounding reference signal (SRS) for scheduling the uplink and outputs the estimation result to the scheduling portion 104.

The reception data demodulating portion 106 also acts as an OFDM demodulating portion and/or a DFT-Spread-OFDM (DFT-S-OFDM) demodulating portion demodulating reception data modulated into the OFDM mode and/or SC-FDMA mode. Based on the uplink channel state estimation result input from the channel estimating portion 105, the reception data demodulating portion 106 executes signal processes to the modulated data input from the radio portion 103 such as DFT transform, sub-carrier mapping, IFFT transform, and filtering and executes the demodulating process before outputs to the data extracting portion 107.

The data extracting portion 107 checks the correctness of the data input from the reception data demodulating portion 106 and outputs the check result (acknowledgement signal ACK/negative acknowledgement signal NACK) to the scheduling portion 104. The data extracting portion 107 divides the data input from the reception data demodulating portion 106 into the transport channels and the physical layer control data before output to the scheduling portion 104. The divided control data consists of the channel state information CSI, the downlink channel quality indicator CQI, the precoding matrix indicator PMI, and the rank indicator RI supplied from the mobile station apparatus 200, the HARQ control information, a scheduling request, etc.

The higher layer 108 executes processes of a packet data convergence protocol (PDCP) layer, a radio link control (RLC) layer, and a radio resource control (RRC) layer. Since the higher layer 108 integrally controls the processing portions of the lower layers, interfaces exist between the higher layer 108 and the scheduling portion 104, the antenna 109, the radio portion 103, the channel estimating portion 105, the reception data demodulating portion 106, the data control portion 101, the transmission data modulating portion 102, and the data extracting portion 107 (although not depicted).

The higher layer 108 has a radio resource control portion 110 (also referred to as a control portion). The radio resource control portion 110 performs management of various pieces of configuration information, management of system information, paging control, management of communication states of mobile station apparatuses, management of migration such as handover, management of buffer status for each mobile station apparatus, management of connection setup of unicast and multicast bearers, management of mobile station identifier (UEID), etc. The higher layer 108 gives/receives information to/from another base station apparatus and information to/from a higher node.

Configuration of Mobile Station Apparatus

Figure 3:
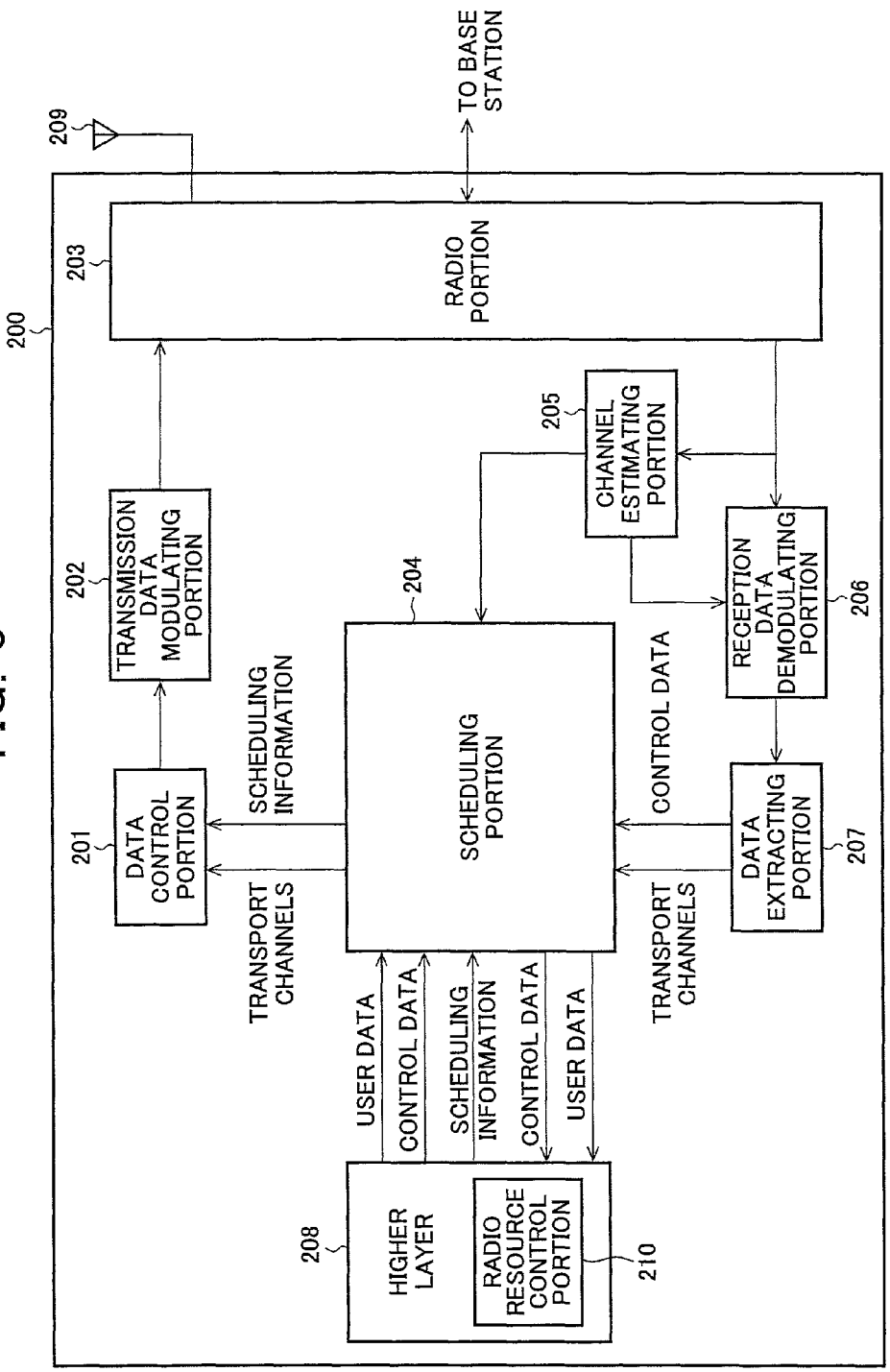
FIG. 3 is a block diagram of a general configuration of a mobile station apparatus 200 according to the embodiment of the present invention.

FIG. 3 is a block diagram of a general configuration of the mobile station apparatus 200 according to an embodiment of the present invention. The mobile station apparatus 200 includes a data control portion 201, a transmission data modulating portion 202, a radio portion 203, a scheduling portion 204, a channel estimating portion 205, a reception data demodulating portion 206, a data extracting portion 207, a higher layer 208, and an antenna 209. A transmitting portion is made up of the data control portion 201, the transmission data modulating portion 202, the radio portion 203, the scheduling portion 204, the higher layer 208, and the antenna 209, and a receiving portion is made up of the radio portion 203, the scheduling portion 204, the channel estimating portion 205, the reception data demodulating portion 206, the data extracting portion 207, the higher layer 208, and the antenna 209.

The data control portion 201, the transmission data modulating portion 202, and the radio portion 203 execute processes of the uplink physical layer. The radio portion 203, the channel estimating portion 205, the reception data demodulating portion 206, and the data extracting portion 207 execute processes of the downlink physical layer.

The data control portion 201 receives the transport channels from the scheduling portion 204. The data control portion 201 maps the transport channels as well as signals and channels generated in the physical layer to the physical channels based on the scheduling information input from the scheduling portion 204. The data mapped as described above are output to the transmission data modulating portion 202.

The transmission data modulating portion 202 modulates transmission data into the OFDM mode and/or the SC-FDMA mode. The transmission data modulating portion 202 executes signal processes such as data modulation, DFT (discrete Fourier transform) process, sub-carrier mapping, IFFT (inverse fast Fourier transform) process, CP insertion, and filtering for the data input from the data control portion 201 to generate and output transmission data to the radio portion 203.

The radio portion 203 up-converts the modulated data input from the transmission data modulating portion 202 to a radio frequency to generate and transmit a radio signal via the antenna 209 to the base station apparatus 100. The radio portion 203 receives a radio signal modulated with the downlink data from the base station apparatus 100 via the antenna 209 and down-converts the signal to a baseband signal to output the reception data to the channel estimating portion 205 and the reception data demodulating portion 206.

The scheduling portion 204 executes a process of a medium access control (MAC) layer. The scheduling portion 104 performs the mapping of the logical channels and the transport channels, the scheduling of downlink and uplink (such as HARQ process and selection of transport format), etc. Since the scheduling portion 204 integrally controls the processing portions of the physical layers, interfaces exist between the scheduling portion 204 and the antenna 209, the data control portion 201, the transmission data modulating portion 202, the channel estimating portion 205, the reception data demodulating portion 206, the data extracting portion 207, and the radio portion 203 (although not depicted).

In the down link scheduling, the scheduling portion 204 executes the reception control of the transport channels and the physical signals and physical channels, the HARQ retransmission control, and the generation of the scheduling information used in the downlink scheduling, based on the scheduling information from the base station apparatus 100 and the higher layer 208 (the transport format and the HARQ retransmission information). The scheduling information used for the downlink scheduling is output to the data control portion 201.

In the uplink scheduling, the scheduling portion 204 executes the scheduling process for mapping the uplink logical channels input from the higher layer 208 to the transport channels and the generation of the scheduling information used in the uplink scheduling, based on the uplink buffer status input from the higher layer 208, the uplink scheduling information from the base station apparatus 100 input from the data extracting portion 207 (the transport format and the HARQ retransmission information), and the scheduling information input from the higher layer 208. For the uplink transport format, the information supplied from the base station apparatus 100 is utilized. The scheduling information is output to the data control portion 201.

The scheduling portion 204 maps the uplink logical channels input from the higher layer 208 to the transport channels before output to the data control portion 201. The scheduling portion 204 also outputs to the data control portion 201 the downlink channel state information (CSI), the downlink channel quality indicator (CQI), the precoding matrix indicator (PMI), and the rank indicator (RI) input from the channel estimating portion 205, and a confirmation result of CRC check input from the data extracting portion 207. The scheduling portion 204 processes the control data acquired through the downlink and the transport channels input from the data extracting portion 207 as needed and maps the control data and the transport channels to the downlink logical channels before output to the higher layer 208.

The channel estimating portion 205 estimates a downlink channel state from a downlink reference signal (RS) for the demodulation of downlink data and outputs the estimation result to the reception data demodulating portion 206. The channel estimating portion 205 estimates a downlink channel state from a downlink reference signal (RS) for notifying the base station apparatus 100 of an estimation result of a downlink channel state (radio propagation channel state) and outputs this estimation result as the downlink channel state information (CSI), the downlink channel quality indicator (CQI), the precoding matrix indicator (PMI), and the rank indicator (RI) to the scheduling portion 204.

The reception data demodulating portion 206 demodulates reception data demodulated into the OFDM mode. The reception data demodulating portion 206 executes the demodulation process for the modulated data input from the radio portion 203 based on the downlink channel state estimation result input from the channel estimating portion 205 before output to the data extracting portion 207.

The data extracting portion 207 performs the CRC check for the data input from the reception data demodulating portion 206 to confirm the correctness and outputs the confirmation result (acknowledgement ACK/negative acknowledgement NACK) to the scheduling portion 204. The data extracting portion 207 divides the data input from the reception data demodulating portion 206 into the transport channels and the physical layer control data before output to the scheduling portion 204. The divided control data includes the scheduling information such as downlink or uplink resource allocation and uplink HARQ control information.

The higher layer 208 executes processes of a packet data convergence protocol (PDCP) layer, a radio link control (RLC) layer, and a radio resource control (RRC) layer. Since the higher layer 208 integrally controls the processing portions of the lower layers, interfaces exist between the higher layer 208 and the scheduling portion 204, the antenna 209, the data control portion 201, the transmission data modulating portion 202, the channel estimating portion 205, the reception data demodulating portion 206, the data extracting portion 207, and the radio portion 203 (although not depicted).

The higher layer 208 has a radio resource control portion 210 (also referred to as a control portion). The radio resource control portion 210 performs management of various pieces of configuration information, management of system information, paging control, management of communication state of the mobile station, management of migration such as handover, management of buffer status, management of connection setup of unicast and multicast bearers, and management of mobile station identifier (UEID).

First Embodiment

A first embodiment of the mobile communication system using the base station apparatus 100 and the mobile station apparatus 200 will be described. In the first embodiment, the base station apparatus allocates a first physical uplink control channel (PUCCH) for transmission of first control information by the mobile station apparatus persistently (permanently) to the mobile station apparatus by using a radio resource control signal (the RRC signaling), and allocates a second physical uplink control channel (PUCCH) for transmission of second control information by the mobile station apparatus dynamically to the mobile station apparatus in association with the physical downlink control channel (PDCCH), and if the physical uplink shared channel (PUSCH) is allocated by the base station apparatus, the mobile station apparatus can transmit, to the base station apparatus, the first control information by using the physical uplink shared channel (PUSCH) and the second control information by using the second physical uplink control channel (PUCCH) in the same sub-frame.

The first control information consists of the channel state information (CSI) indicative of the downlink channel state transmitted (fed back) from the mobile station apparatus to the base station apparatus. The first control information consists of the scheduling request (SR) that requests resource allocation for transmission of the uplink data by the mobile station apparatus. The first control information consists of the channel quality indicator (CQI). The first control information consists of the rank indicator (RI). The first control information consists of the precoding matrix indicator (PMI). The first control information may consist of the HARQ control information for the downlink transport blocks transmitted on the resources persistently allocated by the base station apparatus.

The second control information consists of the HARQ control information (the control signal) for the PDCCH and/or the downlink transport blocks. Therefore, the second control information consists of the HARQ control information for the PDCCH channel and/or the downlink transport blocks transmitted on the resources dynamically allocated by the base station apparatus, and the second control information may consist of the HARQ control information for the downlink transport blocks transmitted on the resources persistently allocated by the base station apparatus. The HARQ control information is the information indicative of ACK/NACK and/or the information indicative of DTX for the PDCCH and/or the downlink transport blocks. The information indicative of DTX is information indicating that the mobile station apparatus cannot detect the PDCCH from the base station apparatus. In this embodiment, the first PUCCH persistently (permanently) allocated indicates, for example, the PUCCH allocated at intervals on the order of 100 ms by the RRC signaling from the base station apparatus (also referred to as persistently allocated PUCCH), and the base station apparatus and the mobile station apparatus ensure the PUCCH allocated by the RRC signaling for a certain period (e.g., about 100 ms) to transmit/receive the data by using the allocated PUCCH. On the other hand, the second PUCCH dynamically allocated indicates, for example, the PUCCH allocated at intervals on the order of 1 ms in association with the PDCCH from the base station apparatus (also referred to as dynamically allocated PUCCH).

Although a frequency band is defined in bandwidth (Hz) in this embodiment, a frequency band may be defined in the number of resource blocks (RBs) constituted of frequency and time. The carrier component in this embodiment indicates a (narrower) frequency band used by the base station apparatus and the mobile station apparatus performing communication in the mobile communication system having a (wider) system band (frequency band). The base station apparatus and the mobile station apparatus aggregate the plurality of carrier component (e.g., five frequency bands each having a bandwidth of 20 MHz) (frequency band aggregation: carrier aggregation) to constitute a (wider) system band (e.g., DL system band/UL system band having a bandwidth of 100 MHz) and can realize high-speed data communication (transmission/reception of information) by using the plurality of carrier component in a multiple manner.

The carrier component indicates each of (narrower) frequency bands (e.g., frequency bands each having a bandwidth of 20 MHz) constitute this (wider) system band (e.g., DL system band/UL system band having a bandwidth of 100 MHz). Therefore, a downlink carrier component has a bandwidth of a portion of the frequency band usable by the base station apparatus and the mobile station apparatus at the time of transmission/reception of the downlink information, and an uplink carrier component has a bandwidth of a portion of the frequency band usable by the base station apparatus and the mobile station apparatus at the time of transmission/reception of the uplink information. The carrier component may be defined as a constituent unit of a certain physical channel (e.g., the PDCCH, the PUCCH).

The carrier components may be mapped in continuous frequency bands or may be mapped in discontinuous frequency bands, and the base station apparatus and the mobile station apparatus aggregate the plurality of carrier components that are continuous and/or discontinuous frequency bands to constitute a wider system band (frequency band) and can realize high-speed data communication (transmission/reception of information) by using the plurality of carrier components in a multiple manner. The downlink frequency band (DL system band, DL system bandwidth) and the uplink frequency band (UL system band, UL system bandwidth) constituted of the carrier component may not be of the same bandwidth and the base station apparatus and the mobile station apparatus can perform communication by using the downlink frequency band and the uplink frequency band having different bandwidths constituted of the carrier component (asymmetric frequency band aggregation described above: asymmetric carrier aggregation).

Figure 4:
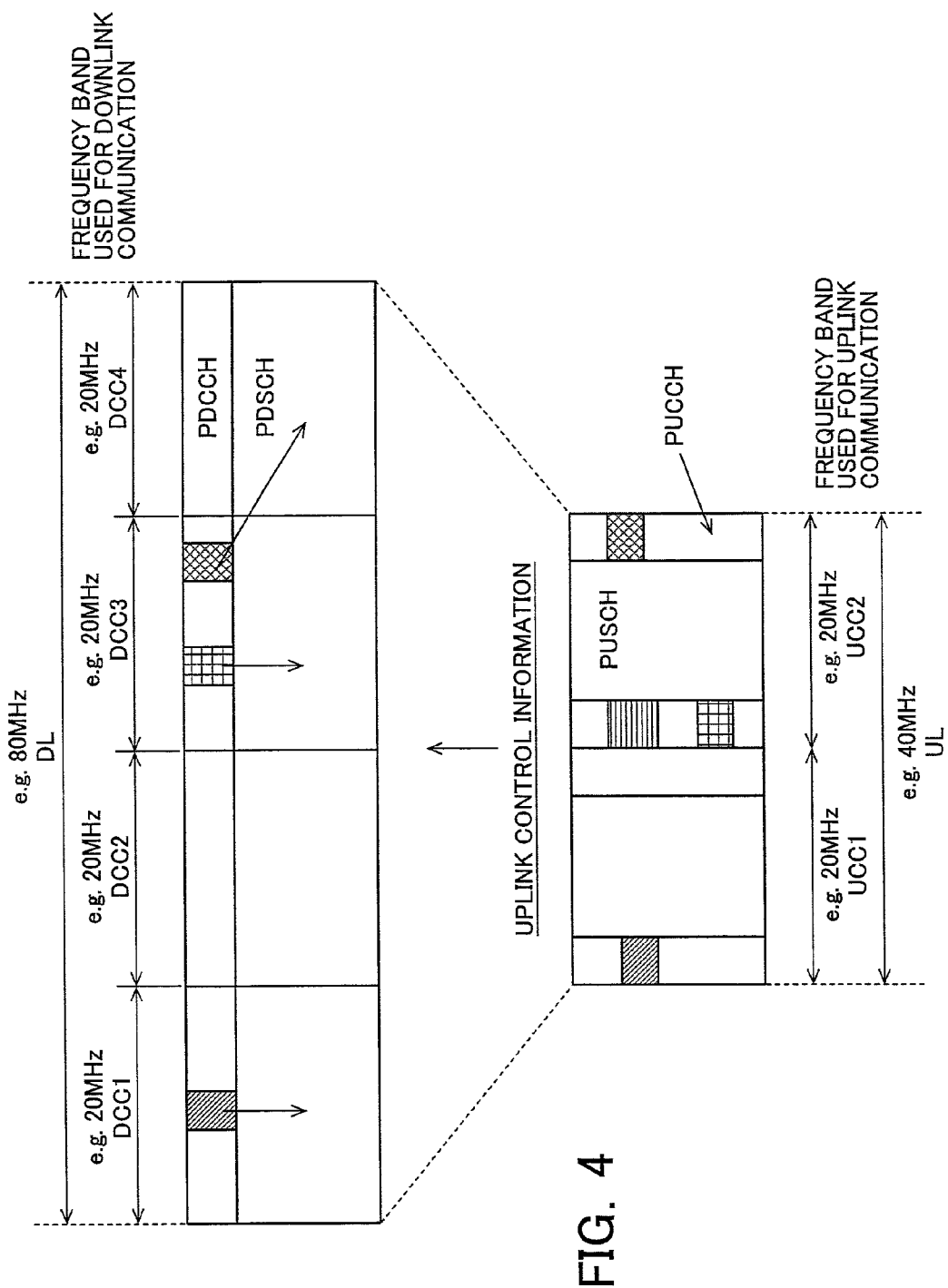
FIG. 4 is a diagram of an example of a mobile communication system to which a first embodiment is applicable.

FIG. 4 is a diagram of an example of a mobile communication system to which the first embodiment is applicable.

Although the first embodiment will hereinafter be described in terms of a mobile communication system subjected to the asymmetric frequency band aggregation as depicted in FIG. 4, this embodiment is applicable to a mobile communication system subjected to the symmetric frequency band aggregation. FIG. 4 depicts that a frequency band (DL system band) used for the downlink communication having a bandwidth of 80 MHz is constituted of four downlink carrier components (DCC1, DCC2, DCC3, and DCC4) each having a bandwidth of 20 MHz, as an example for explaining this embodiment. Byway of example, it is also depicted that a frequency band (UL system band) used for the uplink communication having a bandwidth of 40 MHz is constituted of two uplink carrier components (UCC1 and DCC2) each having a bandwidth of 20 MHz. In FIG. 4, the downlink/uplink channels such as the PDCCH, the PDSCH, the PUCCH, and the PUSCH are mapped on each of the downlink/uplink carrier components. In FIG. 4, there may be the downlink/uplink carrier components any of the downlink/uplink channels such as the PDCCH, the PDSCH, the PUCCH, and the PUSCH are not mapped.

In FIG. 4, it is depicted that the base station apparatus persistently allocates the first PUCCH (the PUCCH indicated by horizontal lines) for transmission of the first control information by the mobile station apparatus, by using the RRC signaling. It is also depicted that the base station apparatus dynamically allocates the second PUCCHs (the PUCCHs respectively indicated by diagonal lines, grid lines, and mesh lines) for transmission of the second control information, in association with PDCCHs (PDCCHs respectively indicated by diagonal lines, grid lines, and mesh lines).

For example, the base station apparatus can dynamically allocate (specify) the second PUCCH for transmission of the second control information by the mobile station apparatus, in association with positions of one (PDCCH indicated by diagonal lines) or the plurality of PDCCHs (PDCCHs respectively indicated by grid lines and mesh lines) mapped on one downlink carrier component in PDCCH resources (PDCCH resource areas) (the base station apparatus can specify which PUCCH mapped on which one of the PUCCH resource areas is used for transmitting the second control information). For example, the PUCCH resources (the PUCCH resource areas) are set by the base station apparatus using the broadcast channel or the RRC signaling, specifically to a cell or a mobile station apparatus. Therefore, the mobile station apparatus can map the second control information on the PUCCH in the PUCCH resources (the PUCCH resource areas) to transmit the second control information to the base station apparatus depending on how one or the plurality of PDCCHs mapped on the one downlink carrier component is mapped in the PDCCH resources (the PDCCH resource areas). A correspondence between one or the plurality of PDCCHs mapped on the one downlink carrier component and respective PUCCHs is specified, for example, by making the first CCE indexes of the CCEs constituting respective PDCCHs and the indexes of respective PUCCHs correspond (FIG. 4 depicts that the first CCE index of the CCEs constituting the PDCCH indicated by diagonal lines corresponds to the index of the PUCCH indicated by diagonal lines, that the first CCE index the CCEs constituting the PDCCH indicated by grid lines corresponds to the index of the PUCCH indicated by grid lines, and that the first CCE index of the CCEs constituting the PDCCH indicated by mesh lines corresponds to the index of the PUCCH indicated by mesh lines).

In FIG. 4, the base station apparatus uses the plurality of PDCCHs to allocate the plurality of PDSCHs and transmits to the mobile station apparatus the control information (such as resource allocation information, MCS information, and HARQ process information) for transmitting the plurality of downlink transport blocks (the plurality of PDCCHs is used for allocating the plurality of PDSCHs to the mobile station apparatus). The base station apparatus uses the plurality of PDSCHs to transmit the plurality of downlink transport blocks in the same sub-frame to the mobile station apparatus. In FIG. 4, by way of example, it is depicted that the base station apparatus uses the PDCCH (the PDCCH indicated by diagonal lines) mapped on DCC1 to allocate the PDSCH mapped on DCC1, and uses the PDCCHs (the PDCCHs respectively indicated by grid lines and mesh lines) mapped on DCC3 to allocate the PDSCHs mapped on DCC3 and DCC4. It is also depicted that the base station apparatus can use the PDSCHs mapped on DCC1, DCC3, and DCC4 to transmit (up to three) downlink transport blocks in the same sub-frame to the mobile station apparatus.

The mobile station apparatus transmits the first control information to the base station apparatus by using the first PUCCH (the PUCCH indicated by horizontal lines) persistently allocated by the RRC signaling. For example, the mobile station apparatus can periodically transmit the channel state information (the first control information) to the base station apparatus by using the first PUCCH persistently allocated. For example, the mobile station apparatus can transmit the scheduling request (the first control information) to the base station apparatus by using the first PUCCH persistently allocated when requesting resource allocation for transmitting the uplink data.

The mobile station apparatus transmits the second control information to the base station apparatus by using the second PUCCHs (the PUCCHs respectively indicated by diagonal lines, grid lines, and mesh lines) dynamically allocated in association with the PDCCHs. For example, the mobile station apparatus can transmit, to the base station apparatus, the HARQ control information (the second control information) for the plurality of PDCCHs and/or the plurality of downlink transport blocks by using the second PUCCHs dynamically allocated, in a bundling manner (in a bundle, in a cluster) or in multiplexing manner (by using a plurality of bits).

Therefore, if the mobile station apparatus transmits the HARQ control information (the second control information) to the base station apparatus in a bundling manner, the mobile station apparatus can calculate (generate) one piece of HARQ control information from respective pieces of the HARQ control information for the plurality of PDCCHs and/or the plurality of downlink transport blocks, and can transmit the one calculated piece of HARQ control information to the base station apparatus. For example, the mobile station apparatus can calculate a logical sum from respective pieces of information indicative of ACK/NACK of HARQ for the plurality of downlink transport blocks to transmit the logical sum to the base station apparatus as information indicative of one ACK/NACK. In FIG. 4, it is depicted that the mobile station apparatus calculates a logical sum of respective pieces of information indicative of ACK/NACK of HARQ for the plurality of downlink transport blocks transmitted in the same sub-frame by using the PDSCHs of DCC1, DCC2, and DCC4 from the base station apparatus, and transmits the logical sum to the base station apparatus as information indicative of one ACK/NACK.

If the mobile station apparatus transmits the HARQ control information (the second control information) to the base station apparatus in a multiplexing manner, the mobile station apparatus can use a plurality of pieces of control information representative of all the combinations of respective pieces of the HARQ control information for the plurality of PDCCHs and/or the plurality of downlink transport blocks to transmit the control information to the base station apparatus (a plurality of pieces of control information equal to or less than pieces of information necessary for representing all the combinations may be used for transmission to the base station apparatus). For example, the mobile station apparatus can use a plurality of bits to represent and transmit to the base station apparatus all the combinations of respective pieces of information indicative of ACK/NACK of HARQ for the plurality of downlink transport blocks. In FIG. 4, it is depicted that the mobile station apparatus uses the plurality of bits to represent and transmit to the base station apparatus all the combinations of respective pieces of the HARQ control information for the plurality of PDCCHs and/or the plurality of downlink transport blocks transmitted on DCC1, DCC2, and DCC4 from the base station apparatus.

If the mobile station apparatus transmits the HARQ control information (the second control information) to the base station apparatus in a bundling manner or in a multiplexing manner, the mobile station apparatus uses any PUCCH of the plurality of PUCCHs (the PUCCHs respectively indicated by diagonal lines, grid lines, and mesh lines) to transmit the control information to the base station apparatus (e.g., any PUCCH of the plurality of PUCCHs is used for transmitting one-bit or two-bit information to the base station apparatus). In this case, the mobile station apparatus can include a few more bits of information into the information transmitted to the base station apparatus depending on which PUCCH is used for transmitting the information among the plurality of PUCCHs prescribed in accordance with how the plurality of PDCCHs is mapped in the PDCCH resources (the PDCCH resource areas) (the positions and the number of the plurality of PDCCHs in the PDCCH resources) (a few bits of information can be included into the information transmitted to the base station apparatus depending on which PUCCH area is used for transmitting the information among areas where PUCCH can be mapped). For example, in FIG. 4, if two-bit information (four types of information) can be transmitted on each of three PUCCHs (the PUCCHs respectively indicated by diagonal lines, grid lines, and diagonal lines), the mobile station apparatus can transmit a total of 12 types of information to the base station apparatus depending on which PUCCH is used among three PUCCHs (by performing channel selection among three PUCCH). Transmission of information in this way enables the mobile station apparatus to transmit more information to the base station apparatus and, for example, the mobile station apparatus can transmit to the base station apparatus more combinations that represent information indicative of which PDCCHs are received (detected) among the plurality of PDCCHs transmitted from the base station apparatus and the HARQ control information (the second control information).

Figure 5:
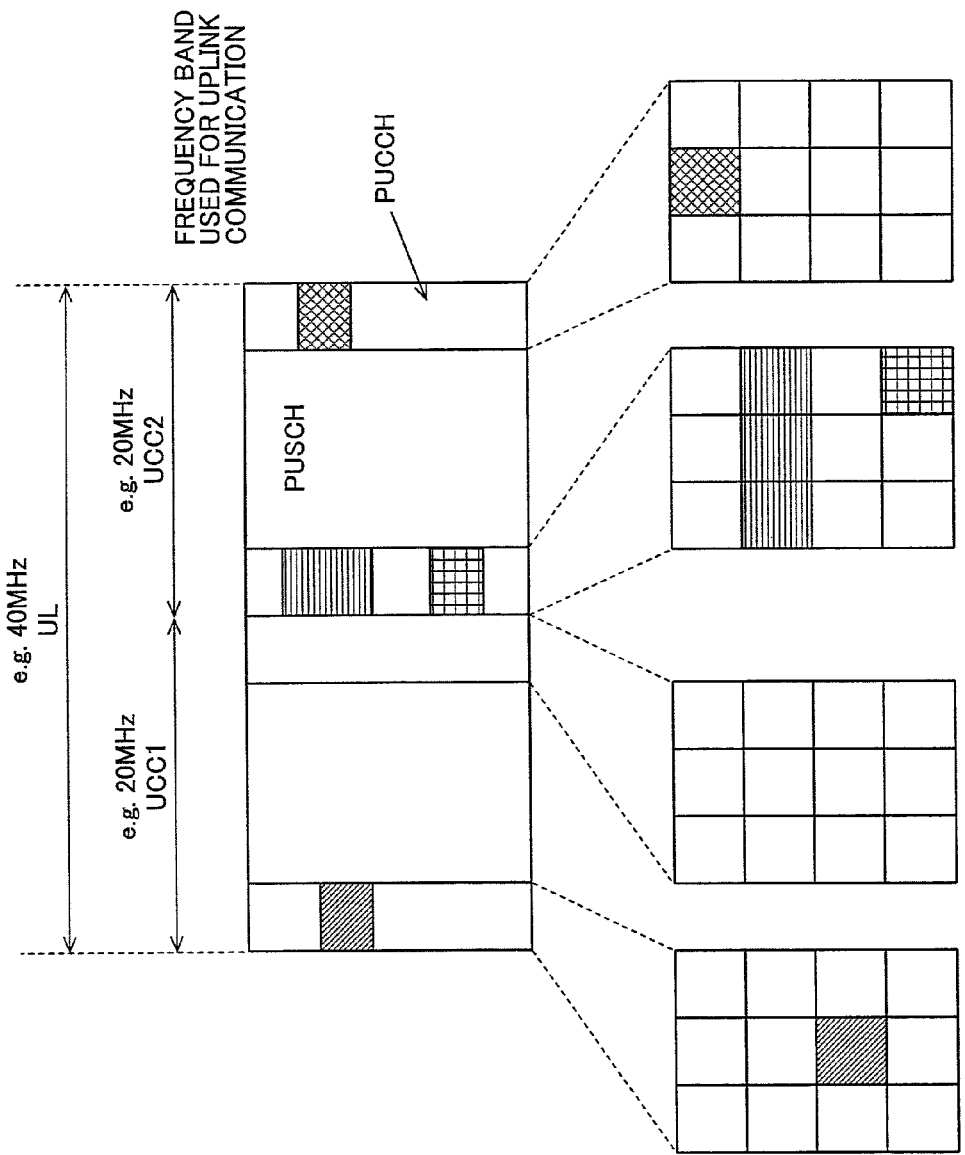
FIG. 5 is another diagram of an example of a mobile communication system to which the first embodiment is applicable.

FIG. 5 is a conceptual diagram of the first PUCCH (the PUCCH indicated by horizontal lines) persistently allocated by the RRC signaling and the second PUCCHs (the PUCCHs respectively indicated by diagonal lines, grid lines, and mesh lines) dynamically allocated in association with the PDCCHs. In FIG. 5, by way of example, it is depicted that two PUCCH resources (the PUCCH resource areas) each having a size of "3×4=12" are present on each of the uplink carrier components (UCC1, UCC2) (it is depicted that the PUCCH resources having a total size of "24" are present for two PUCCHs distributed and mapped at both ends (edge portions) of each of UCC1 and UCC2). In this embodiment, resources of the PUCCH and the PUSCH allocated by the base station apparatus include frequency resources, time resources, and code resources.

In FIG. 5, it is depicted that the base station apparatus persistently allocates the PUCCH (the PUCCH indicated by horizontal lines) having a size of "3" mapped on UCC2 as the first PUCCH. It is also depicted that the base station apparatus dynamically allocates the PUCCHs (the PUCCHs respectively indicated by diagonal lines, grid lines, and mesh lines) each having a size of "1" mapped on UCC1 and UCC2 as the second PUCCHs. The mobile station apparatus can transmit the first control information by using the first PUCCH mapped on UCC2 and the second control information by using any PUCCH of the second PUCCHs mapped on UCC1 and UCC2, both in the same sub-frame to the base station apparatus (the plurality of PUCCHs can simultaneously be transmitted). For example, in FIG. 5, the mobile station apparatus can simultaneously transmit the channel state information (the first control information) by using the first PUCCH mapped on UCC2 and the HARQ control information (the second control information) by using any PUCCH of the second PUCCHs mapped on UCC1 and UCC2 to the base station apparatus. For example, the mobile station apparatus can simultaneously transmit the scheduling request (the first control information) by using the first PUCCH mapped on UCC2 and the HARQ control information (the second control information) by using any PUCCH of the second PUCCHs mapped on UCC1 and UCC2 to the base station apparatus.

Figure 6:
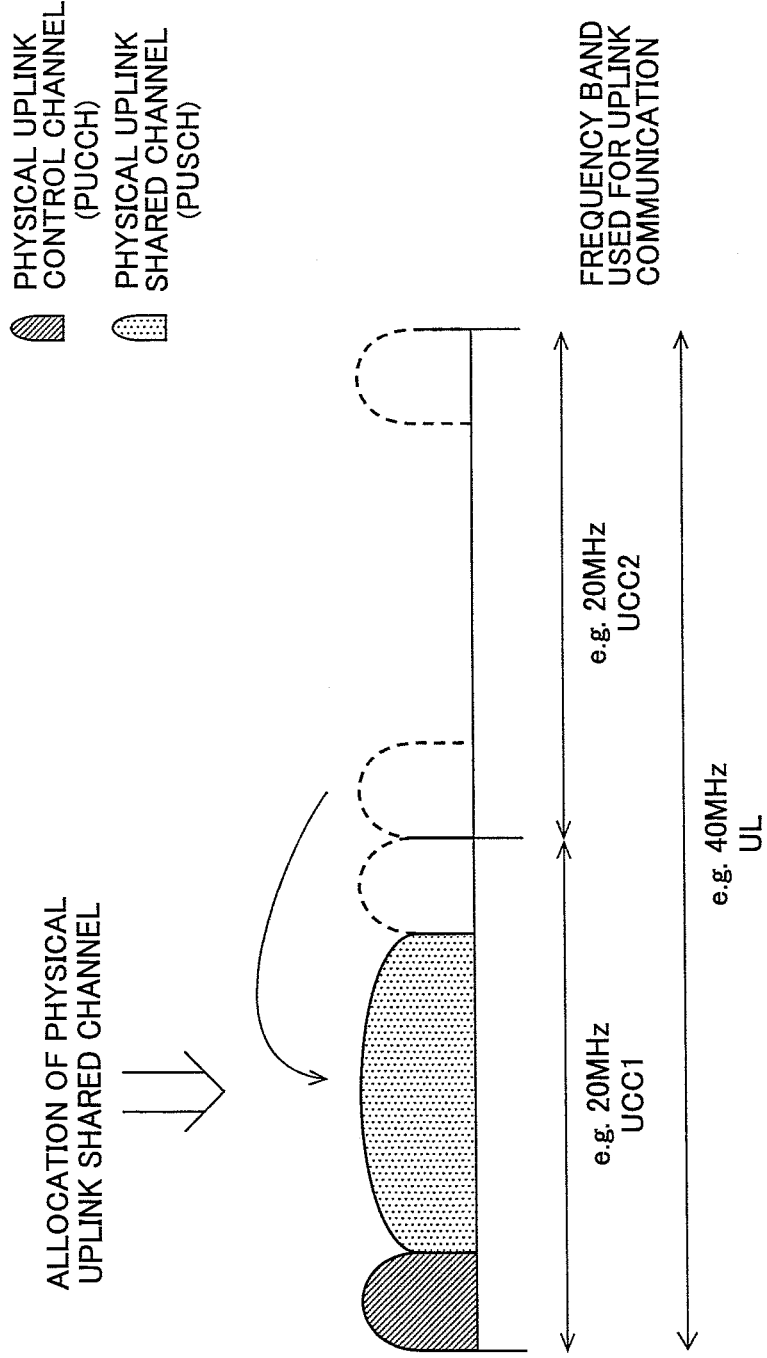
FIG. 6 is a diagram for explaining an example of operation of the mobile station apparatus when a physical uplink shared channel is allocated.

FIG. 6 is a diagram for explaining operation of the mobile station apparatus if the physical uplink shared channel (PUSCH) is allocated by the base station apparatus when the mobile station apparatus is transmitting the first control information and the second control information. In this embodiment, for clarity of the description, it is assumed that the mobile station apparatus uses the PUCCH indicated by diagonal lines mapped on UCC1 (the second PUCCH indicated by diagonal lines of FIG. 5) to transmit the second control information to the base station apparatus.

In FIG. 6, when the mobile station apparatus is transmitting the first control information by using the first (persistently allocated) PUCCH mapped on UCC2 and the second control information by using the second (dynamically allocated) PUCCH (the PUCCH indicated by diagonal lines) mapped on UCC1, if the PUSCH (the PUSCH indicated by a dot pattern) mapped on UCC1 is allocated by the base station apparatus, the mobile station apparatus transmits the first control information by using the allocated PUSCH and the second control information by using the second PUCCH, both in the same sub-frame to the base station apparatus. In other words, the mobile station apparatus maps (also referred to as piggy-backs) the first control information that would be transmitted by using the first PUCCH persistently allocated, onto the PUSCH mapped on UCC1, and performs the simultaneous transmission of the PUSCH and the PUCCH. When the mobile station apparatus maps and transmits both the first control information and the uplink data (the UL-SCH) on the PUSCH allocated by the base station apparatus, for example, the time division multiplexing (TDM) or the joint coding is applied to the first control information and the uplink data (the UL-SCH), and the first control information and the uplink data (the UL-SCH) are transmitted to the base station apparatus.

For example, in FIG. 6, when the mobile station apparatus is transmitting the channel state information (the first control information) by using the first PUCCH mapped on UCC2 and the HARQ control information (the second control information) by using the second PUCCH mapped on UCC1, if the PUSCH mapped on UCC1 is allocated by the base station apparatus, the mobile station apparatus can simultaneously transmit the channel state information (the first control information) by using the allocated PUSCH and the HARQ control information (the second control information) by using the second PUCCH. When the mobile station apparatus is transmitting the scheduling request (the first control information) by using the first PUCCH mapped on UCC2 and the HARQ control information (the second control information) by using the second PUCCH mapped on UCC1, if the PUSCH mapped on UCC1 is allocated by the base station apparatus, the mobile station apparatus can simultaneously transmit the schedule request (the first control information) by using the allocated PUSCH and the HARQ control information (the second control information) by using the second PUCCH.

Figure 7:
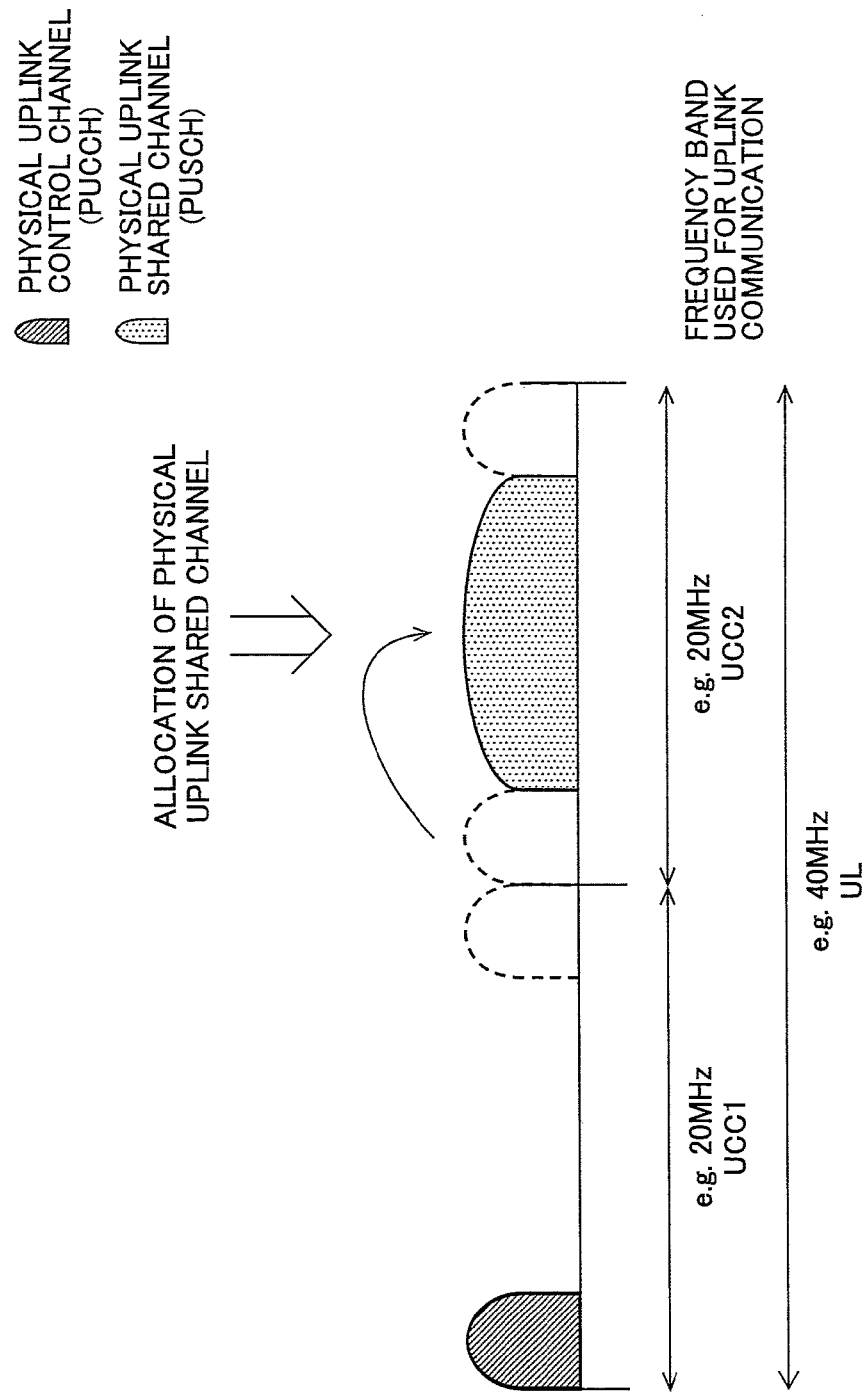
FIG. 7 is another diagram for explaining an example of operation of the mobile station apparatus when the physical uplink shared channel is allocated.

Similarly, FIG. 7 is a diagram for explaining operation of the mobile station apparatus if the PUSCH is allocated by the base station apparatus when the mobile station apparatus is transmitting the first control information and the second control information. In FIG. 7, when the mobile station apparatus is transmitting the first control information by using the first (persistently allocated) PUCCH mapped on UCC2 and the second control information by using the second (dynamically allocated) PUCCH (the PUCCH indicated by diagonal lines) mapped on UCC1, if the PUSCH (the PUSCH indicated by a dot pattern) mapped on UCC2 is allocated by the base station apparatus, the mobile station apparatus transmits the first control information by using the allocated PUSCH and the second control information by using the second PUCCH, both in the same sub-frame to the base station apparatus. In other words, the mobile station apparatus maps the first control information that would be transmitted by using the first PUCCH persistently allocated, onto the PUSCH mapped on UCC2, and performs the simultaneous transmission of the PUSCH and the PUCCH.

In this embodiment, the HARQ control information for the downlink transport blocks transmitted on the resources persistently allocated by the base station apparatus may be included in either the first control information or the second control information. If the HARQ control information for the downlink transport blocks transmitted on the resources persistently allocated by the base station apparatus is defined as the first control information, the managements of the persistently allocated resources and the dynamically allocated resources can be separated, thereby facilitating estimation of overhead in the base station apparatus. On the other hand, if the HARQ control information for the downlink transport blocks transmitted on the resources persistently allocated by the base station is defined as the second control information, the effect of multiplexing of the HARQ control information can be acquired.

As described above, in the mobile communication system including the base station apparatus and the mobile station apparatus using the carrier components in a multiple manner to perform communication in a wider frequency band, when the mobile station apparatus is transmitting the first control information by using the first PUCCH persistently allocated and the second control information by using the second PUCCH dynamically allocated, if the PUSCH is allocated by the base station apparatus, the mobile station apparatus transmits the first control information by using the allocated PUSCH and the second control information by using the second PUCCH to the base station apparatus, thereby performing the simultaneous transmission of the data (information) on the plurality of PUSCHs and PUCCHs with the transmission power in the mobile station apparatus suppressed to a lower level. Since the mobile station apparatus maps the first control information that would be transmitted on the first PUCCH persistently allocated, onto the PUSCH allocated by the base station apparatus, and performs the simultaneous transmission of the PUSCH and the PUCCH, the mobile station apparatus can reduce (limit) the number of uplink channels simultaneously transmitted to the base station apparatus, thereby suppressing the transmission power in the mobile station apparatus to a lower level (the simultaneous transmission with transmission on the PUCCH reduced (limited) enables the mobile station apparatus to suppress the transmission power to a lower level).

Second Embodiment

A second embodiment of the present invention will be described. In the second embodiment, the base station apparatus can persistently allocate the plurality of the first PUCCHs for transmission of the first control information by the mobile station apparatus, in the same sub-frame by using the RRC signaling. The base station apparatus can persistently allocate the plurality of the first PUCCHs for transmission of each of the plurality of pieces of the first control information by the mobile station apparatus, in the same sub-frame by using the RRC signaling. The other points are the same as the first embodiment.

Figure 8:
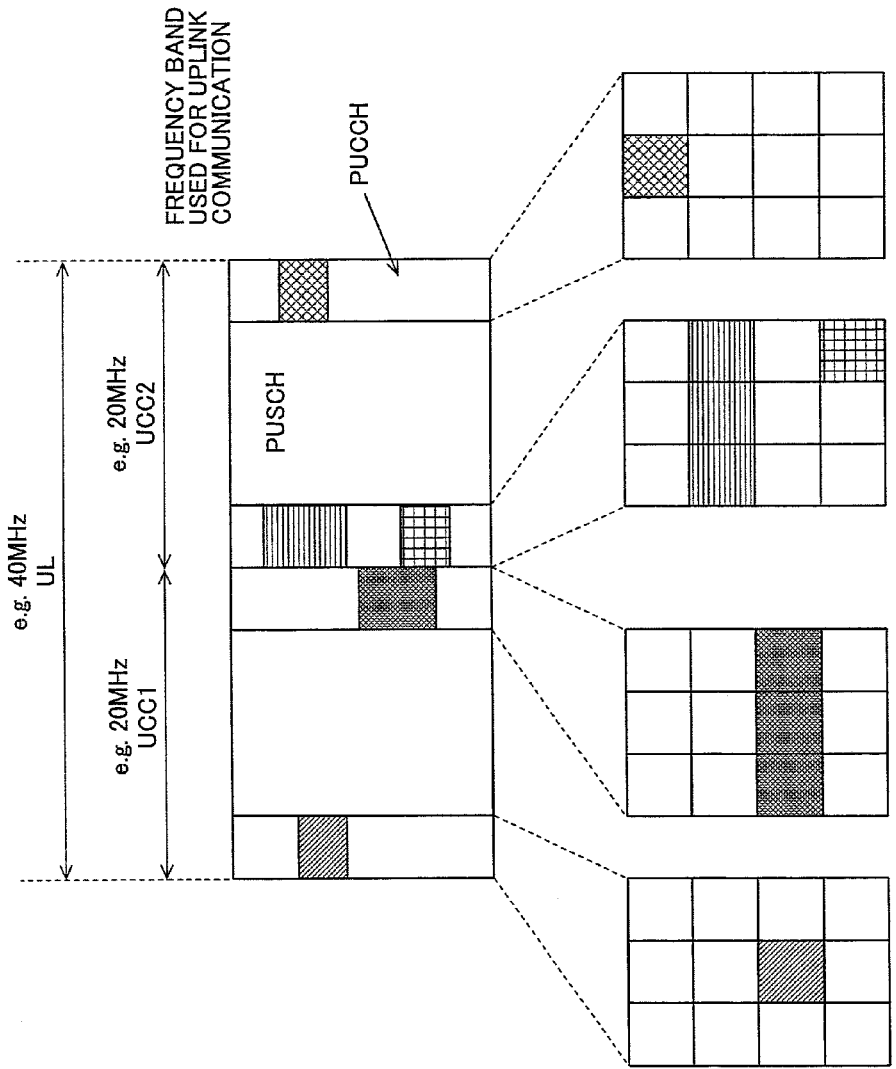
FIG. 8 is a diagram of an example of a mobile communication system to which a second embodiment is applicable.

FIG. 8 is a conceptual diagram of the plurality of the first PUCCHs (the PUCCHs respectively indicated by horizontal lines and painting black) persistently allocated by the RRC signaling and the second PUCCHs (the PUCCHs respectively indicated by diagonal lines, grid lines, and mesh lines) dynamically allocated in association with the PDCCHs. In FIG. 8, it is depicted that the base station apparatus persistently allocates the PUCCHs (the PUCCHs indicated by horizontal lines and painting black) each having a size of "3" mapped on UCC1 and UCC2 as the first PUCCHs. It is also depicted that the base station apparatus dynamically allocates the PUCCHs (the PUCCHs respectively indicated by diagonal lines, grid lines, and mesh lines) each having a size of "1" mapped on UCC1 and UCC2 as the second PUCCHs. In the second embodiment, for clarity of the description, it is assumed that the mobile station apparatus uses the second PUCCH indicated by diagonal lines mapped on UCC1 to transmit the second control information to the base station apparatus.

In FIG. 8, the mobile station apparatus transmits the first control information to the base station apparatus by using the plurality of the first (persistently allocated) PUCCHs mapped on UCC1 and UCC2. For example, the mobile station apparatus can transmit the first control information to which the joint coding is applied to the base station apparatus by using the plurality of the first PUCCHs. In this case, the mobile station apparatus can transmit the first control information to the base station apparatus by applying the code division multiplexing (CDM) or the frequency division multiplexing (FDM) of the plurality of the first PUCCHs. The frequency division multiplexing (FDM) across the uplink carrier components (UCC1, UCC2) may be applied to the plurality of the first PUCCHs. In other words, the base station apparatus can persistently allocate to the same sub-frame the plurality of the first PUCCHs for transmission of the first control information by the mobile station apparatus.

In FIG. 8, it is depicted that the mobile station apparatus transmits the first control information by using the plurality of the first PUCCHs mapped on UCC1 and UCC2, and the second control information by using the second PUCCH mapped on UCC1, both in the same sub-frame to the base station apparatus (the simultaneous transmission of the plurality of PUCCHs is performed).

For example, in FIG. 8, the mobile station apparatus can simultaneously transmit the channel state information (the first control information) by using the plurality of the first PUCCHs mapped on UCC1 and UCC2, and the HARQ control information (the second control information) by using the second PUCCH mapped on UCC1. For example, the mobile station apparatus can simultaneously transmit the scheduling request (the first control information) by using the plurality of the first PUCCHs mapped on UCC1 and UCC2, and the HARQ control information (the second control information) by using the second PUCCH mapped on UCC1.

In FIG. 8, the mobile station apparatus can transmit each of the plurality of pieces of the first control information to the base station apparatus by using the plurality of the first (persistently allocated) PUCCHs mapped on UCC1 and UCC2. For example, the mobile station apparatus can separately transmit each of the plurality of pieces of the first control information to the base station apparatus by using the plurality of the first PUCCHs. In other words, the base station apparatus can persistently allocate in the same sub-frame the plurality of the first PUCCHs for transmission of each of the plurality of pieces of the first control information by the mobile station apparatus.

In this case, the mobile station apparatus can transmit the first control information and the second control information by using the first and/or second PUCCHs mapped on UCC1, and the first control information by using the first PUCCH mapped on UCC2, both in the same sub-frame to the base station apparatus (the simultaneous transmission of the plurality of PUCCH can be performed). When the mobile station apparatus transmits both the first control information and the second control information by using the first and/or second PUCCHs mapped on UCC1, for example, the first control information and the second control information are transmitted to the base station apparatus by applying the time division multiplexing (TDM), the joint coding, the code division multiplexing (CDM), or the frequency division multiplexing (FDM).

For example, in FIG. 8, the mobile station apparatus can simultaneously transmit the channel state information (the first control information) and the HARQ control information (the second control information) by using the first and/or second PUCCHs mapped on UCC1 and the channel state information (the first control information) by using the first PUCCH mapped on UCC2. In this case, the channel state information transmitted by using the first and/or second PUCCHs mapped on UCC1 can indicate the channel states for DCC1 and DCC2 of FIG. 4, for example, and the channel state information transmitted by using the first PUCCH mapped on UCC2 can indicate the channel states for DCC3 and DCC4 of FIG. 4, for example. The channel state information transmitted by the mobile state apparatus may be other pieces of information, and which downlink carrier component has the channel state information transmitted by an uplink carrier component (a correspondence between the downlink carrier component and the uplink carrier component) is settable by the broadcast channel or the RRC signaling from the base station apparatus specifically to a cell or specifically to a mobile station apparatus.

For example, the mobile station apparatus can simultaneously transmit the scheduling request (the first control information) and the HARQ control information (the second control information) by using the first and/or second PUCCHs mapped on UCC1 and the scheduling request (the first control information) by using the first PUCCH mapped on UCC2. In this case, the scheduling request (the first control information) transmitted by using the first and/or second PUCCHs mapped on UCC1 can request resource allocation for transmitting the uplink data on UCC1 and UCC2 of FIG. 4, for example, and the scheduling request (the first control information) transmitted by using the first PUCCH mapped on UCC2 can also request resource allocation for transmitting the uplink data on UCC1 and UCC2 of FIG. 4 (i.e., the scheduling request can request resource allocation to all the uplink carrier components).

Figure 9:
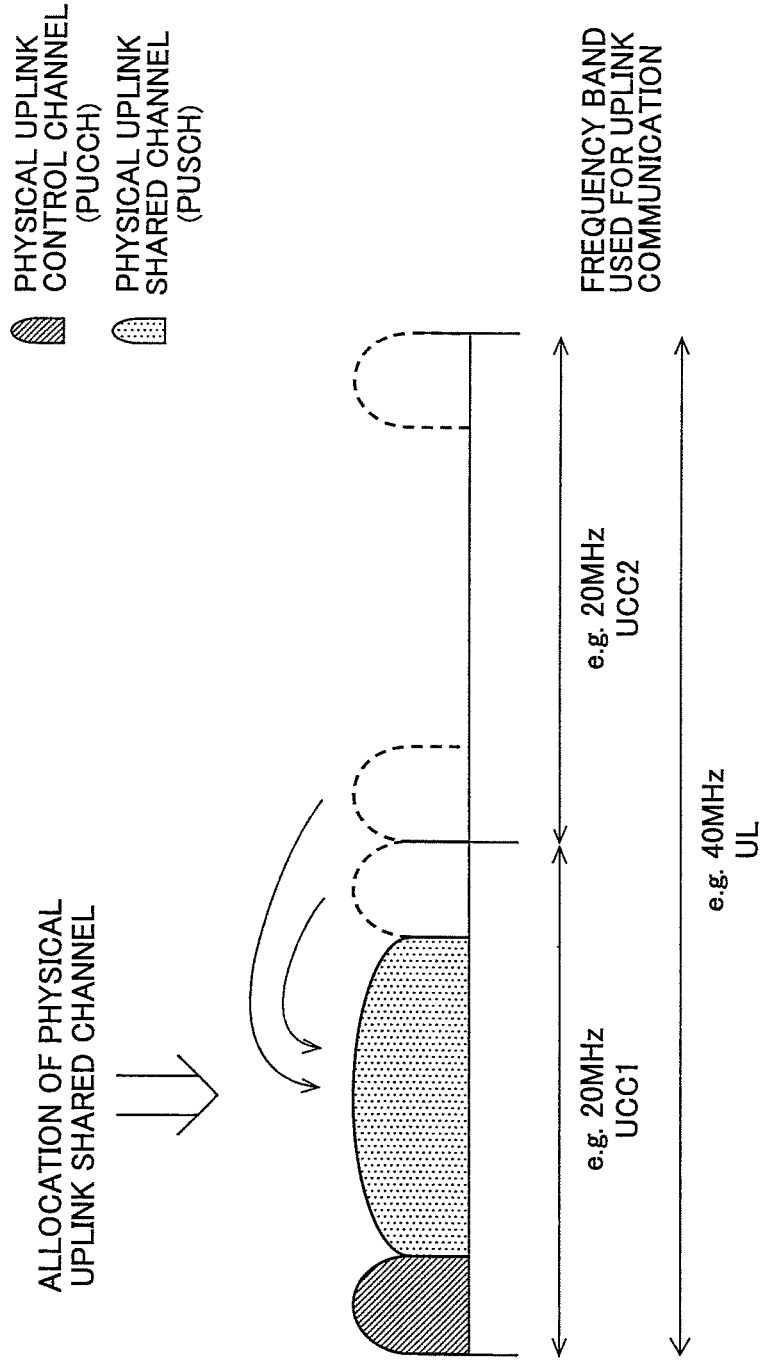
FIG. 9 is yet another diagram for explaining an example of operation of the mobile station apparatus when the physical uplink shared channel is allocated.

FIG. 9 is a diagram for explaining operation of the mobile station apparatus if PUSCH is allocated by the base station apparatus when the mobile station apparatus is transmitting the first control information and the second control information. As described above, it is assumed that the mobile station apparatus uses the PUCCH indicated by diagonal lines mapped on UCC1 (the second PUCCH indicated by diagonal lines of FIG. 5) to transmit the second control information to the base station apparatus.

In FIG. 9, when the mobile station apparatus is transmitting the first control information by using the plurality of the first (persistently allocated) PUCCHs mapped on UCC1 and UCC2, and the second control information by using the second (dynamically allocated) PUCCH (the PUCCH indicated by diagonal lines) mapped on UCC1, if the PUSCH (the PUSCH indicated by a dot pattern) mapped on UCC1 is allocated by the base station apparatus, the mobile station apparatus transmits the first control information by using the allocated PUSCH and the second control information by using the second PUCCH, both in the same sub-frame to the base station apparatus. In other words, the mobile station apparatus maps (piggy-backs) the first control information that would be transmitted by using the first PUCCH persistently allocated, onto the PUSCH mapped on UCC1, and performs the simultaneous transmission of the PUSCH and the PUCCH.

For example, in FIG. 9, when the mobile station apparatus is transmitting the channel state information (the first control information) by using the plurality of the first PUCCHs mapped on UCC1 and UCC2, and the HARQ control information (the second control information) by using the second PUCCH mapped on UCC1, if the PUSCH mapped on UCC1 is allocated by the base station apparatus, the mobile station apparatus can simultaneously transmit the channel state information (the first control information) by using the allocated PUSCH and the HARQ control information (the second control information) by using the second PUCCH. In other words, when the mobile station apparatus is transmitting the channel state information (the first control information) by using the plurality of the first PUCCHs mapped on UCC1 and UCC2, if the PUSCH mapped on UCC1 is allocated by the base station apparatus, the mobile station apparatus can simultaneously transmit the channel state information (the first control information) by using the allocated PUSCH together with the HARQ control information (the second control information).

For example, when the mobile station apparatus is transmitting the scheduling request (the first control information) by using the plurality of the first PUCCHs mapped on UCC1 and UCC2, and the HARQ control information (the second control information) by using the second PUCCH mapped on UCC1, if the PUSCH mapped on UCC1 is allocated by the base station apparatus, the mobile station apparatus can simultaneously transmit the scheduling request (the first control information) by using the allocated PUSCH and the HARQ control information (the second control information) by using the second PUCCH to the base station apparatus. In other words, when the mobile station apparatus is transmitting the scheduling request (the first control information) by using the plurality of the first PUCCHs mapped on UCC1 and UCC2, if the PUSCH mapped on UCC1 is allocated by the base station apparatus, the mobile station apparatus can simultaneously transmit the scheduling request (the first control information) by using the allocated PUSCH together with the HARQ control information (the second control information).

Figure 10:
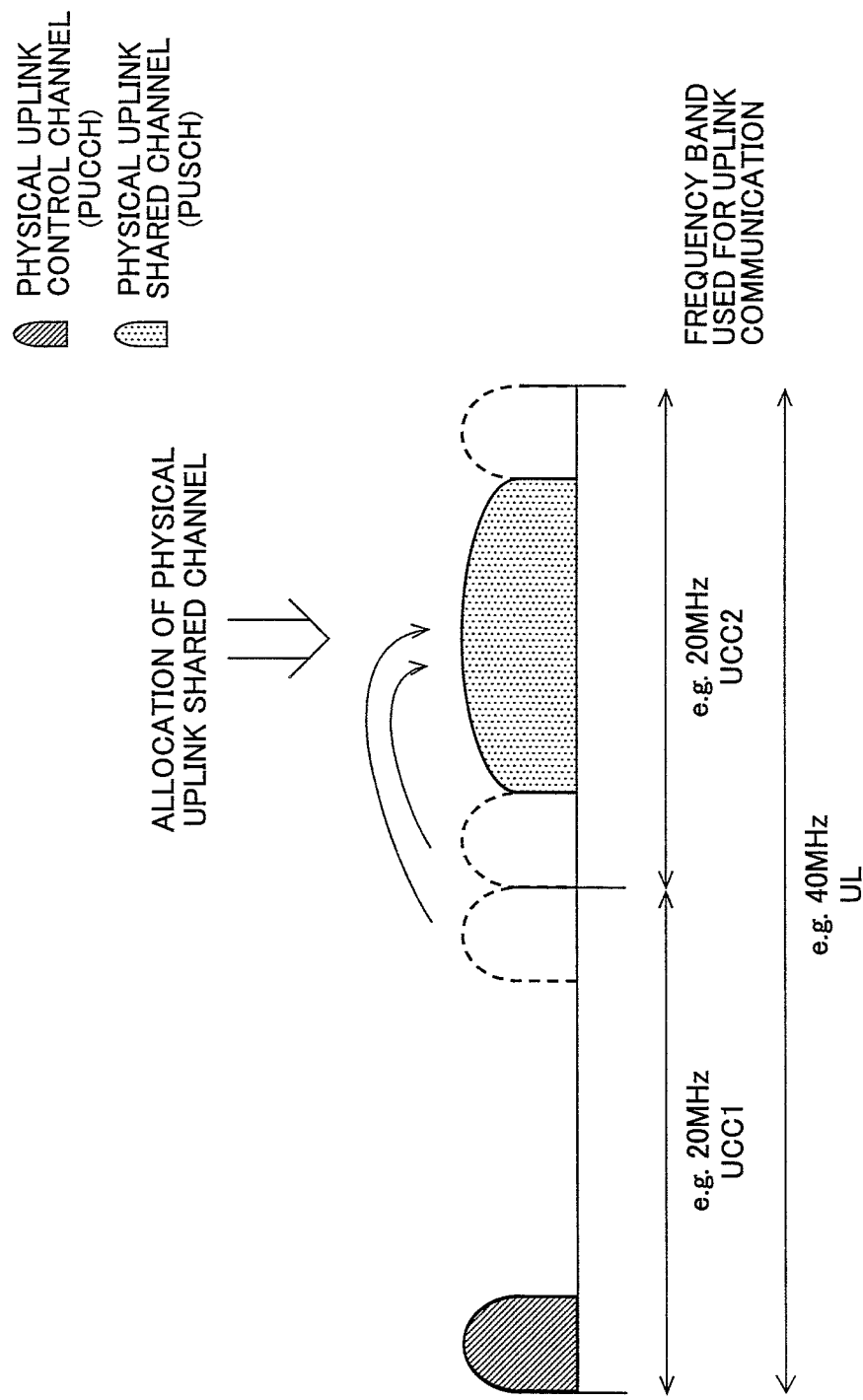
FIG. 10 is still another diagram for explaining an example of operation of the mobile station apparatus when the physical uplink shared channel is allocated.

Similarly, FIG. 10 is a diagram for explaining operation of the mobile station apparatus if the PUSCH is allocated by the base station apparatus when the mobile station apparatus simultaneously transmits the first control information and the second control information by using the plurality of PUCCHs. In FIG. 10, when the mobile station apparatus is transmitting the first control information by using the first (persistently allocated) PUCCHs mapped on UCC1 and UCC2, and the second control information by using the second (dynamically allocated) PUCCH (the PUCCH indicated by diagonal lines) mapped on UCC1, if the PUSCH (the PUSCH indicated by a dot pattern) mapped on UCC2 is allocated by the base station apparatus, the mobile station apparatus transmits the first control information by using the allocated PUSCH and the second control information by using the second PUCCH, both in the same sub-frame to the base station apparatus. In other words, the mobile station apparatus maps the first control information that would be transmitted by using the first PUCCH persistently allocated, onto the PUSCH mapped on UCC2, and performs the simultaneous transmission of the PUSCH and the PUCCH.

Figure 11:
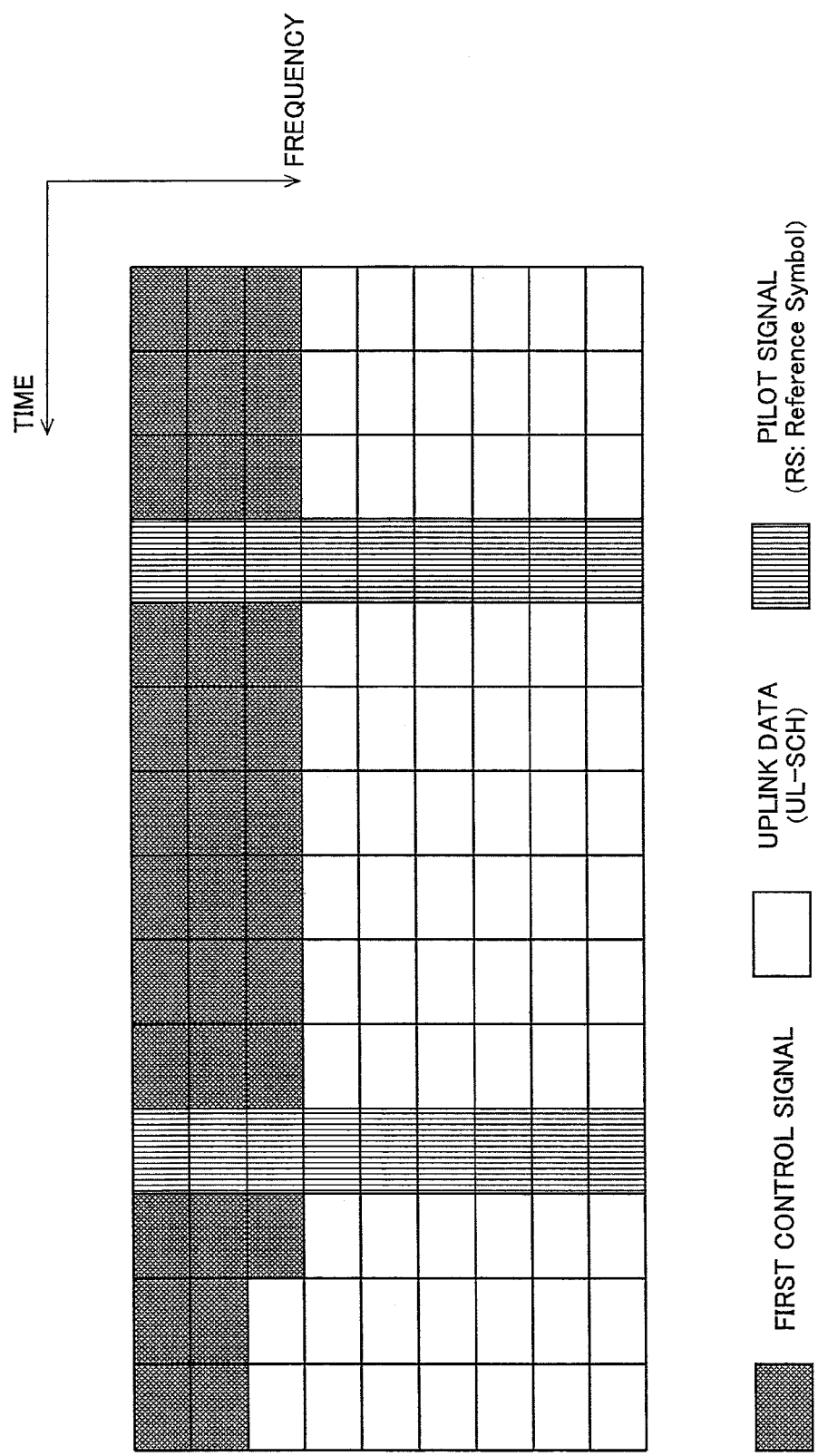
FIG. 11 is a diagram for explaining an example of arrangement of first control information and uplink data.

FIG. 11 depicts an example when the mobile station apparatus maps both the first control information and the uplink data (the UL-SCH) on the PUSCH allocated by the base station apparatus. In FIG. 11, it is depicted that the first control information to which the joint coding is applied (indicated by fine mesh lines), the uplink data (the UL-SCH) (indicated by painting white), and the pilot signals (the RS: the reference symbols) (indicated by vertical lines) are mapped on the PUSCH allocated by the base station apparatus.

As depicted in FIG. 11, if the mobile station apparatus maps the first control information and the uplink data (the UL-SCH) on the PUSCH allocated by the base station apparatus, the mobile station apparatus maps the first control information in the time axis direction (the direction of row index in a matrix before DFT) and then in the frequency axis direction (the direction of column index in a matrix before DFT) after the first control information is mapped on all the areas (e.g., all the SC-FDMA symbols) in the time axis direction (after the first control information is mapped on 12 SC-FDMA symbols except RS) (referred to as time-first mapping). Although this matrix has the same configuration as mapping of resource elements, the matrix is spread in the frequency direction because a DFT process is eventually executed for this matrix. The number of areas on which the first control information (e.g., the number of SC-FDMA symbols) is mapped, is varied depending on MCS (modulation scheme and/or coding scheme) for the PUSCH allocated by the base station apparatus and a resource size (a size of the PUSCH resource allocated as a time domain and/or a frequency domain) (MCS (modulation scheme and/or coding scheme) of the first control information may be fixed to default values). The uplink data (the UL-SCH) is mapped by the time-first mapping after the first control information is mapped. Since the mobile station apparatus maps and transmits to the base station apparatus both the first control information and the uplink data (the UL-SCH) on the PUSCH with the predefined mapping method as described above, it is not necessary to receive an indication related to mapping from the base station apparatus and the downlink radio resources can efficiently be used for performing the simultaneous transmission of the PUSCH and the PUCCH.

Figure 12:
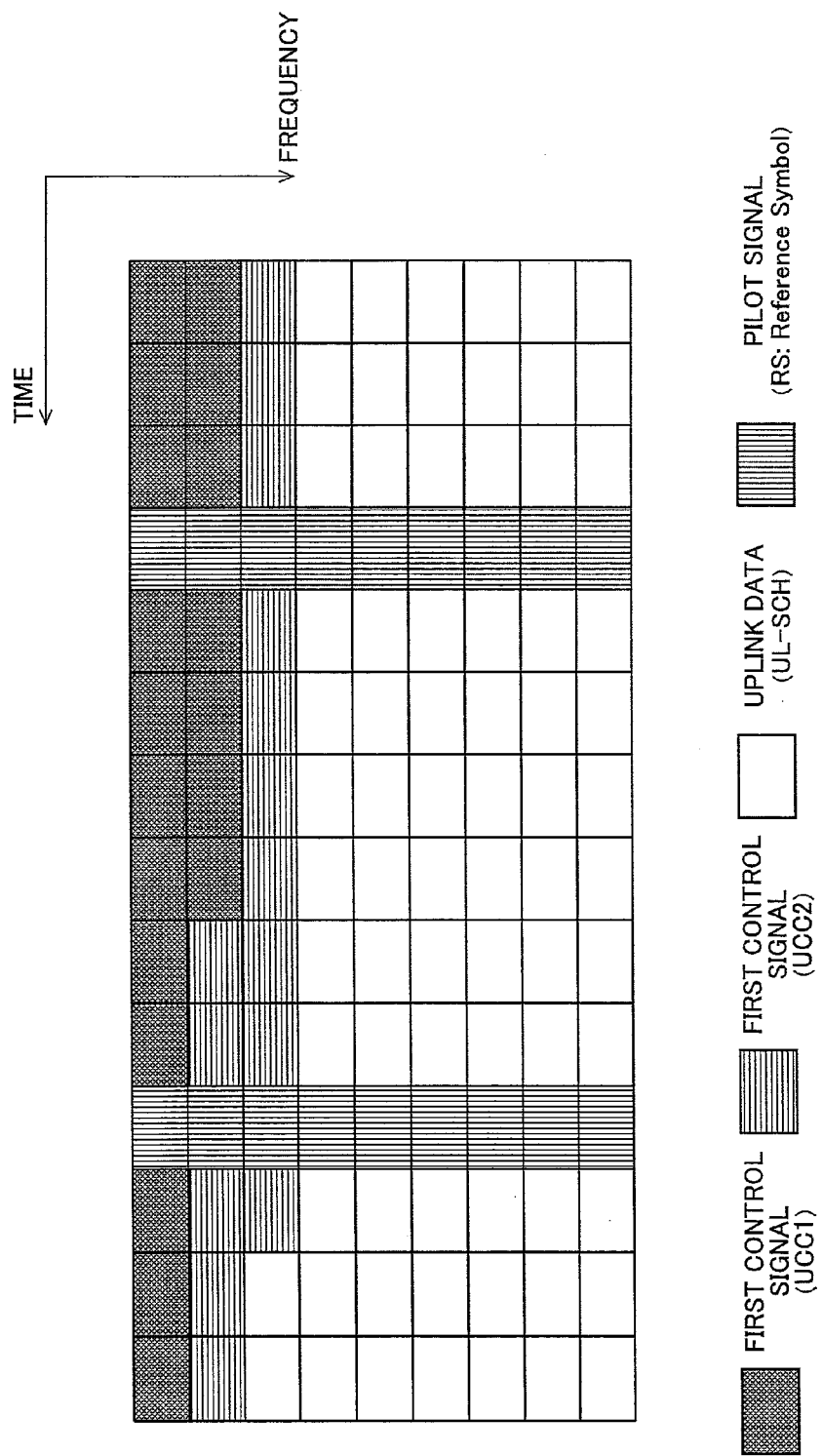
FIG. 12 is another diagram for explaining an example of arrangement of the first control information and the uplink data.

FIG. 12 depicts another example when the mobile station apparatus maps both each of the plurality of pieces of the first control information and the uplink data (the UL-SCH) on PUSCH allocated by the base station apparatus. In FIG. 12, it is depicted that each of the plurality of independent pieces of the first control information (respectively indicated by painting black and horizontal lines), the uplink data (the UL-SCH) (indicated by painting white), and the pilot signals (the RS) (indicated by vertical lines) are mapped on the PUSCH allocated by the base station apparatus.

As depicted in FIG. 12, if the mobile station apparatus maps each piece of the first control information and the uplink data (the UL-SCH) on the PUSCH allocated by the base station apparatus, for example, the mobile station apparatus adds index to each of the plurality of pieces of the first control information and maps the first control information in increasing order of the index by the time-first mapping. In FIG. 12, it is depicted that the index is added depending on a frequency position of the uplink carrier components (UCC1, UCC2) (in increasing order (or decreasing order) of frequency), and the mobile station apparatus first maps the first control information that would be transmitted on the first PUCCH mapped on UCC1 with a lower index (at a lower (or higher) frequency position), and subsequently maps the first control information that would be transmitted on the first PUCCH mapped on UCC2 with a higher index (at a higher (or lower) frequency position). After each of the plurality of pieces of the first control information is mapped in increasing order (or decreasing order) of the index, the uplink data (the UL-SCH) is mapped by the time-first mapping. Since the mobile station apparatus maps and transmits to the base station apparatus both each of the plurality of pieces of the first control information and the uplink data (the UL-SCH) on PUSCH with the predefined mapping method as described above, it is not necessary to receive an indication related to mapping from the base station apparatus and the downlink radio resources can efficiently be used for performing the simultaneous transmission of the PUSCH and the PUCCH.

Figure 13:
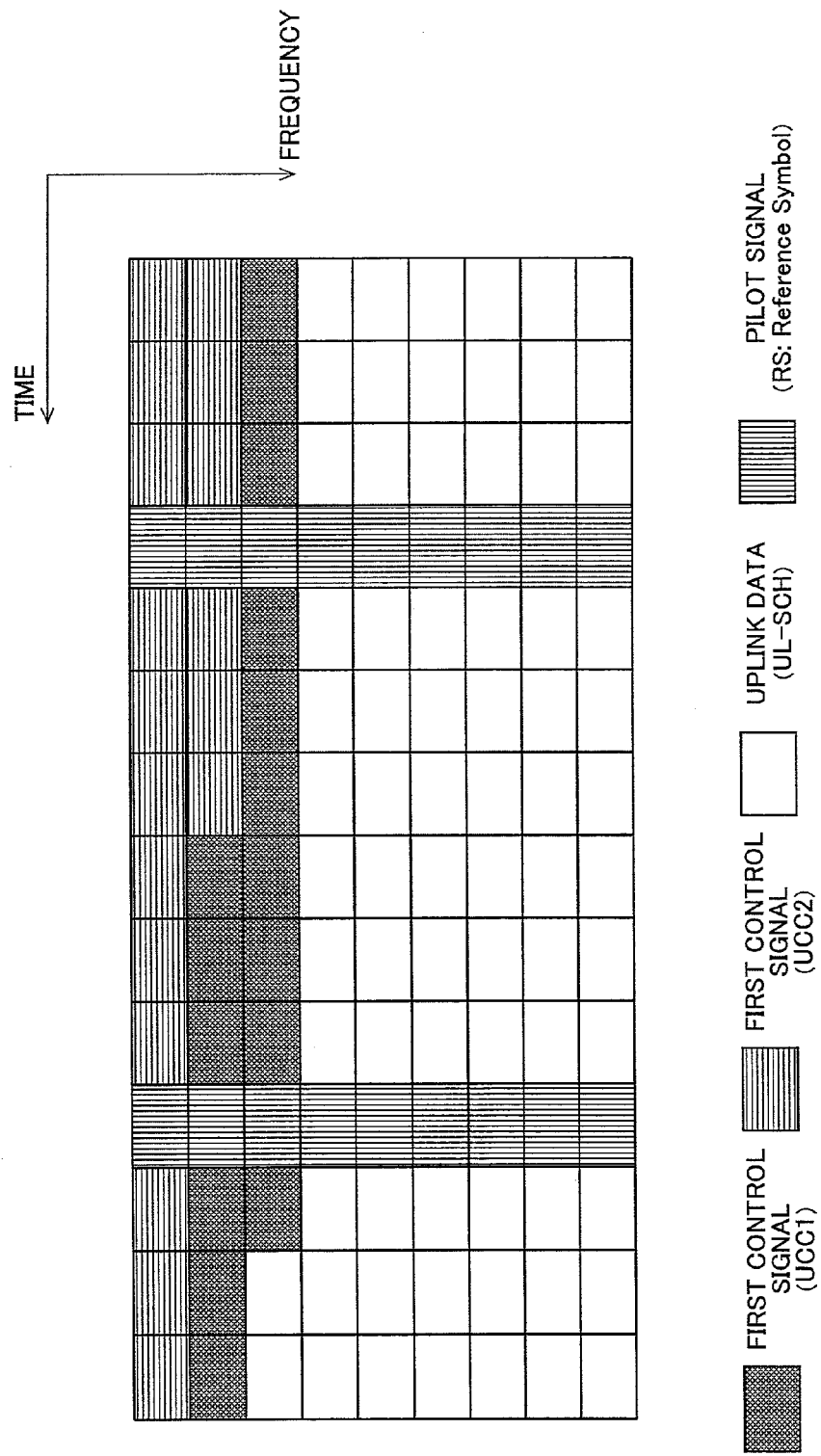
FIG. 13 is a further diagram for explaining an example of arrangement of the first control information and the uplink data.

FIG. 13 depicts a further example when the mobile station apparatus maps both each of the plurality of pieces of the first control information and the uplink data (the UL-SCH) on PUSCH allocated by the base station apparatus. In FIG. 13, it is depicted that each of the plurality of independent pieces of the first control information (respectively indicated by painting black and horizontal lines), the uplink data (the UL-SCH) (indicated by painting white), and the pilot signals (RS) (indicated by vertical lines) are mapped on the PUSCH allocated by the base station apparatus.

As depicted in FIG. 13, if the mobile station apparatus maps each piece of the first control information and the uplink data (the UL-SCH) on the PUSCH allocated by the base station apparatus, for example, the mobile station apparatus first maps the first control information that would be transmitted on the first PUCCH mapped on the uplink carrier components to which the PUSCH is allocated, by the time-first mapping. In FIG. 13, it is depicted that the base station apparatus allocates the PUSCH mapped on UCC2, and the mobile station apparatus first maps the first control information that would be transmitted on the first PUCCH mapped on UCC2 and subsequently maps the first control information that would be transmitted on the first PUCCH mapped on UCC1. The uplink data (the UL-SCH) is mapped by the time-first mapping after each of the plurality of pieces of the first control information is mapped. Since the mobile station apparatus maps and transmits to the base station apparatus both each of the plurality of pieces of the first control information and the uplink data (the UL-SCH) on PUSCH with the predefined mapping method as described above, it is not necessary to receive an indication related to mapping from the base station apparatus and the downlink radio resources can efficiently be used for performing the simultaneous transmission of the PUSCH and the PUCCH.

In this embodiment, the HARQ control information for the downlink transport blocks transmitted on the resource persistently allocated by the base station apparatus may be included in either the first control information or the second control information. If the HARQ control information for the downlink transport blocks transmitted on the resource persistently allocated by the base station apparatus is defined as the first control information, the managements of the persistently allocated resource and the dynamically allocated resource can be separated, thereby facilitating estimation of overhead in the base station apparatus. On the other hand, if the HARQ control information for the downlink transport blocks transmitted by the resource persistently allocated by the base station is defined as the second control information, the effect of multiplexing of the HARQ control information can be acquired.

As described above, in the mobile communication system including the base station apparatus and the mobile station apparatus using the carrier components in a multiple manner to perform communication in a wider frequency band, when the mobile station apparatus is transmitting the first control information and the second control information by using the plurality of persistently and dynamically allocated PUCCHs, if the PUSCH is allocated by the base station apparatus, the mobile station apparatus transmits the first control information by using the allocated PUSCH and the second control information by using the second PUCCH to the base station apparatus, thereby performing the simultaneous transmission of the data (information) on the plurality of the PUSCHs and the PUCCHs with the transmission power in the mobile station apparatus suppressed to a lower level. Since the mobile station apparatus maps the first control information that would be transmitted on the first PUCCH persistently allocated, onto the PUSCH allocated by the base station apparatus, and performs the simultaneous transmission of the PUSCH and the PUCCH, the mobile station apparatus can reduce (limit) the number of uplink channels simultaneously transmitted to the base station apparatus, thereby suppressing the transmission power in the mobile station apparatus to a lower level (the simultaneous transmission with transmission on the PUCCH reduced (limited) enables the mobile station apparatus to suppress the transmission power to a lower level).

Third Embodiment

A third embodiment of the present invention will be described. In the third embodiment, if the mobile station apparatuses described in the first embodiment and the second embodiment receive transmission permission information from the base station apparatus that gives indication for transmitting all the control information (the first control information and the second control information) on allocated PUSCH, the mobile station apparatuses can transmit all the control information (the first control information and the second control information) on the allocated PUSCH.

Figure 14:
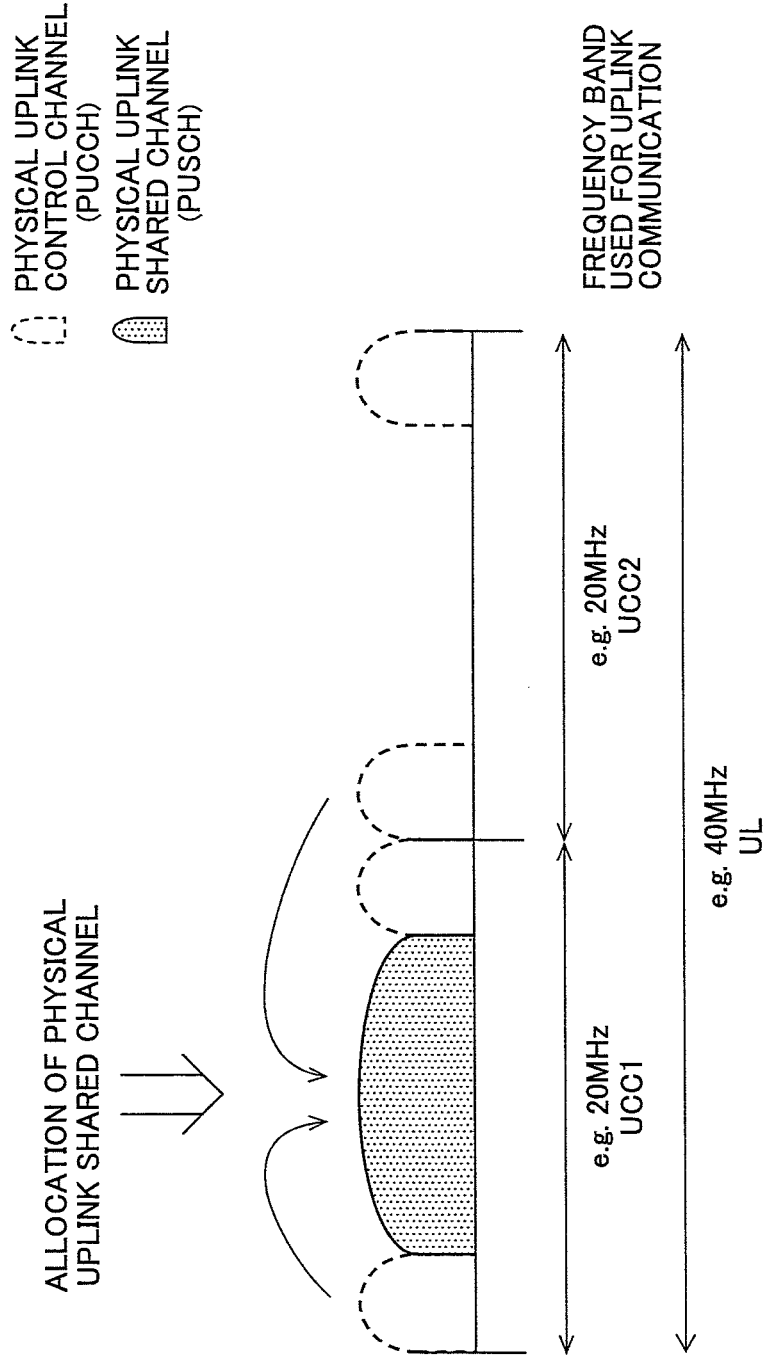
FIG. 14 is a further diagram for explaining an example of operation of the mobile station apparatus when the physical uplink shared channel is allocated.

FIG. 14 is a diagram for explaining operation of the mobile station apparatus if the PUSCH is allocated by the base station apparatus when the mobile station apparatus described in the first embodiment is transmitting the first control information and the second control information. In this embodiment, for clarity of the description, it is assumed that the mobile station apparatus uses the PUCCH indicated by diagonal lines mapped on UCC1 (the second PUCCH indicated by diagonal lines of FIG. 5) to transmit the second control information to the base station apparatus.

In FIG. 14, the base station apparatus transmits to the mobile station apparatus the transmission permission information that gives indication for transmitting all the control information (the first control information and the second control information) on allocated PUSCH. This transmission permission information is included, for example, in the RRC signaling or the uplink transmission permission signal and transmitted to the mobile station apparatus. When the mobile station apparatus receiving this transmission permission information transmits the first control information and the second control information, if the PUSCH (the PUSCH indicated by a dot pattern) is allocated by the base station apparatus, the mobile station apparatus maps all the control information (the first control information and the second control information) on the allocated PUSCH to transmit the control information to the base station apparatus. In other words, when the mobile station apparatus is transmitting the first control information by using the first (persistently allocated) PUCCH mapped on UCC2 and the second control information by using the second (dynamically allocated) PUCCH mapped on UCC1, if the PUSCH mapped on UCC1 (the PUSCH indicated by a dot pattern) is allocated by the base station apparatus, the mobile station apparatus uses the allocated PUSCH to transmit all the control information (the first control information and the second control information) to the base station apparatus. If the PUSCH mapped on UCC2 is allocated by the base station apparatus, the mobile station apparatus naturally performs the same operation.

Figure 15:
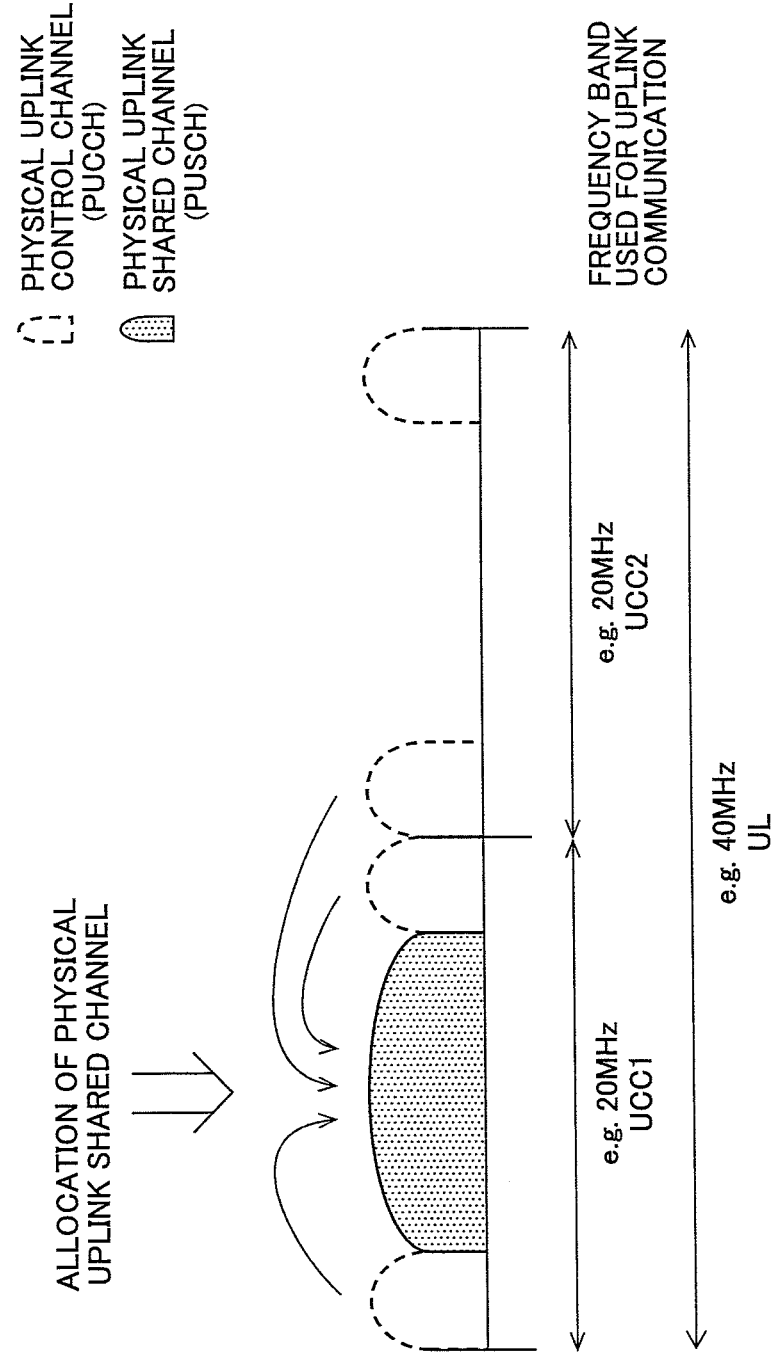
FIG. 15 is a yet further diagram for explaining an example of operation of the mobile station apparatus when the physical uplink shared channel is allocated.

Similarly, FIG. 15 is a diagram for explaining operation of the mobile station apparatus if the PUSCH is allocated by the base station apparatus when the mobile station apparatus described in the second embodiment is transmitting the first control information and the second control information. In FIG. 15, the base station apparatus transmits to the mobile station apparatus the transmission permission information that gives indication for transmitting all the control information (the first control information and the second control information) on allocated PUSCH. When the mobile station apparatus receiving this transmission permission information transmits the first control information and the second control information, if the PUSCH (the PUSCH indicated by a dot pattern) is allocated by the base station apparatus, the mobile station apparatus maps all the control information (the first control information and the second control information) on the allocated PUSCH to transmit the control information to the base station apparatus. In other words, when the mobile station apparatus is transmitting the first control information and the second control information (by using the first PUCCH and/or the second PUCCH persistently or dynamically allocated), if the PUSCH mapped on UCC1 (the PUSCH indicated by a dot pattern) is allocated by the base station apparatus, the mobile station apparatus uses the allocated PUSCH to transmit all the control information (the first control information and the second control information) to the base station apparatus. If the PUSCH mapped on UCC2 is allocated by the base station apparatus, the mobile station apparatus naturally performs the same operation.

Figure 16:
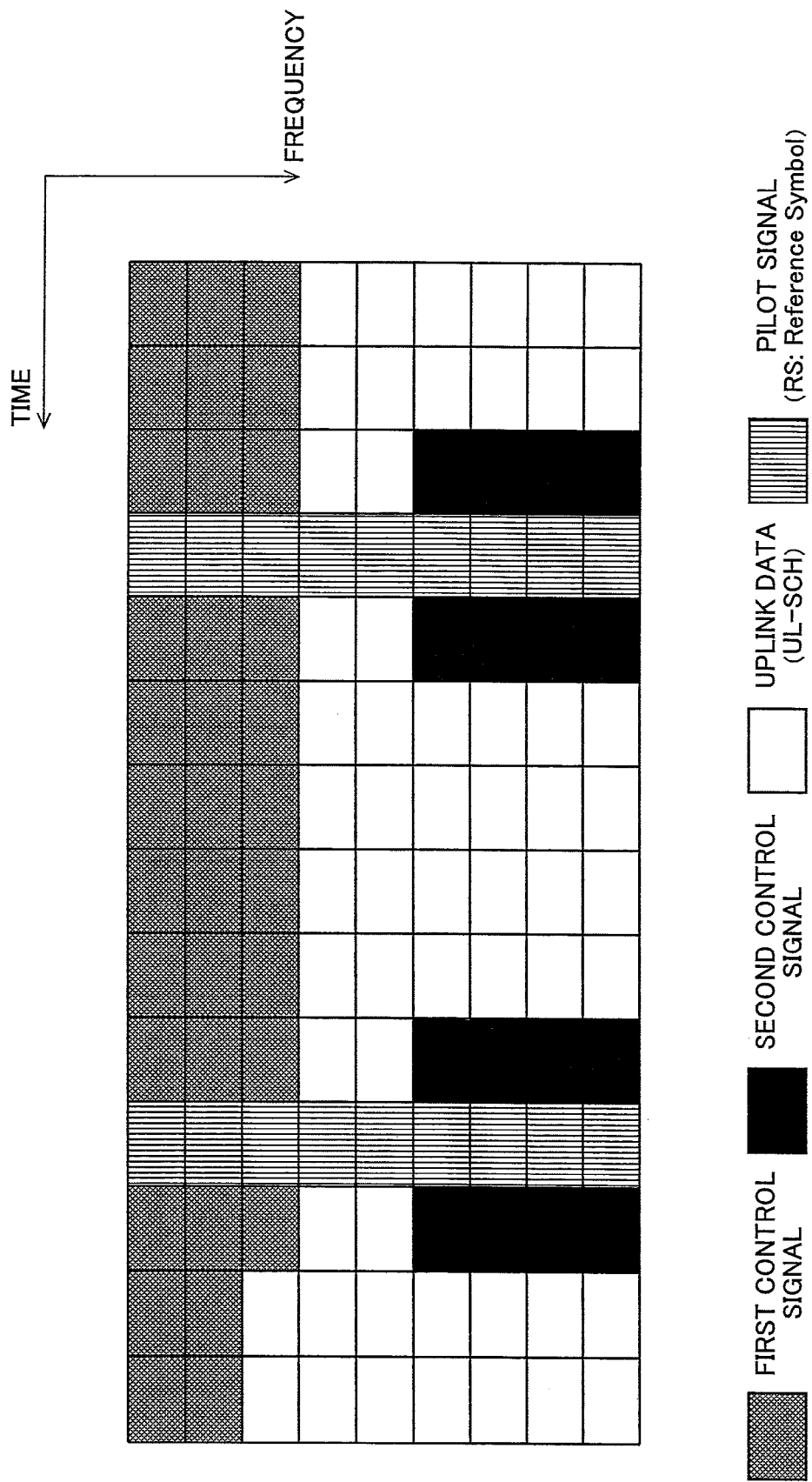
FIG. 16 is a diagram for explaining an example of arrangement of the first control information, a second control information, and the uplink data.
Figure 17:
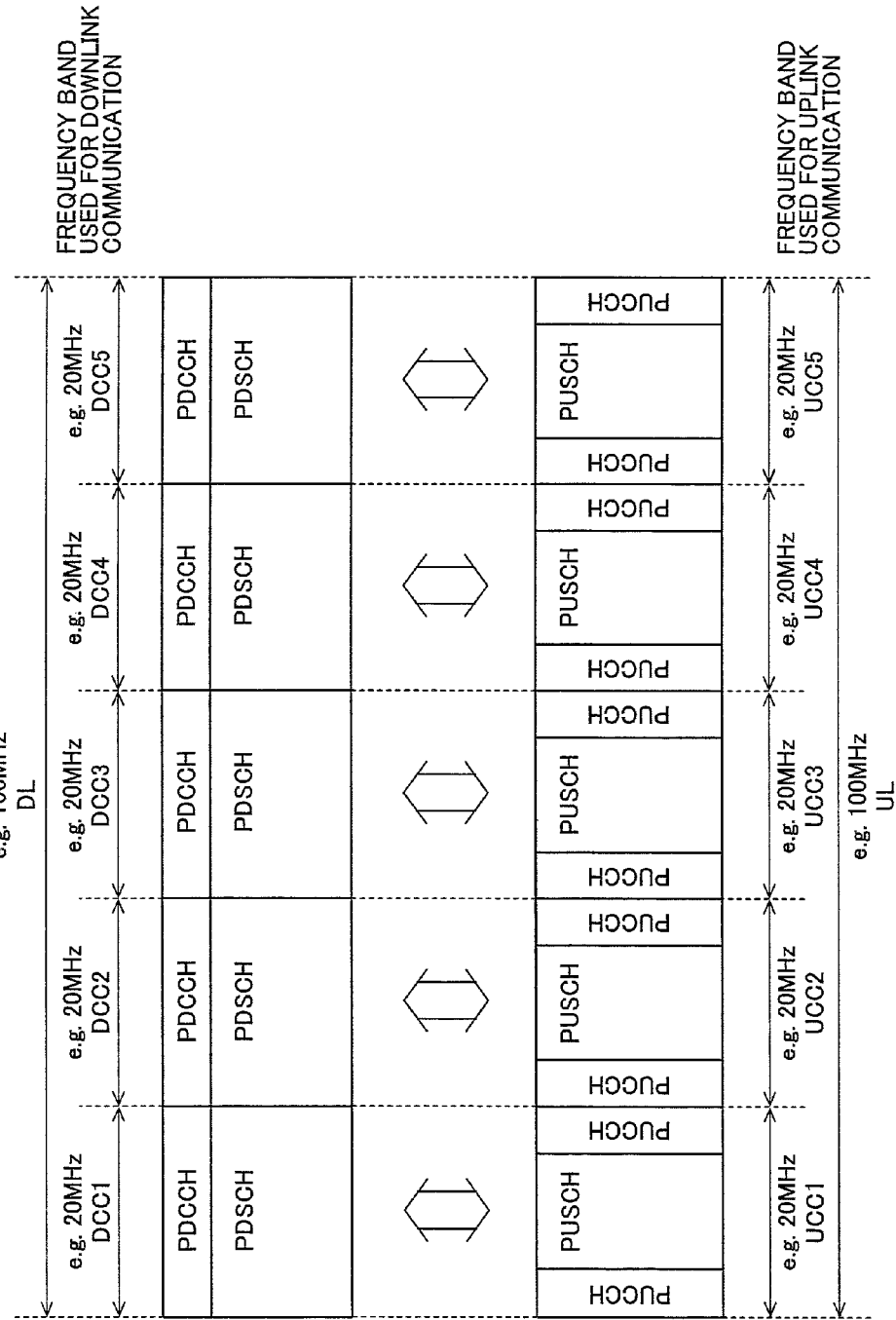
FIG. 17 is a diagram of an example of frequency band aggregation in a conventional technique.
Figure 18:
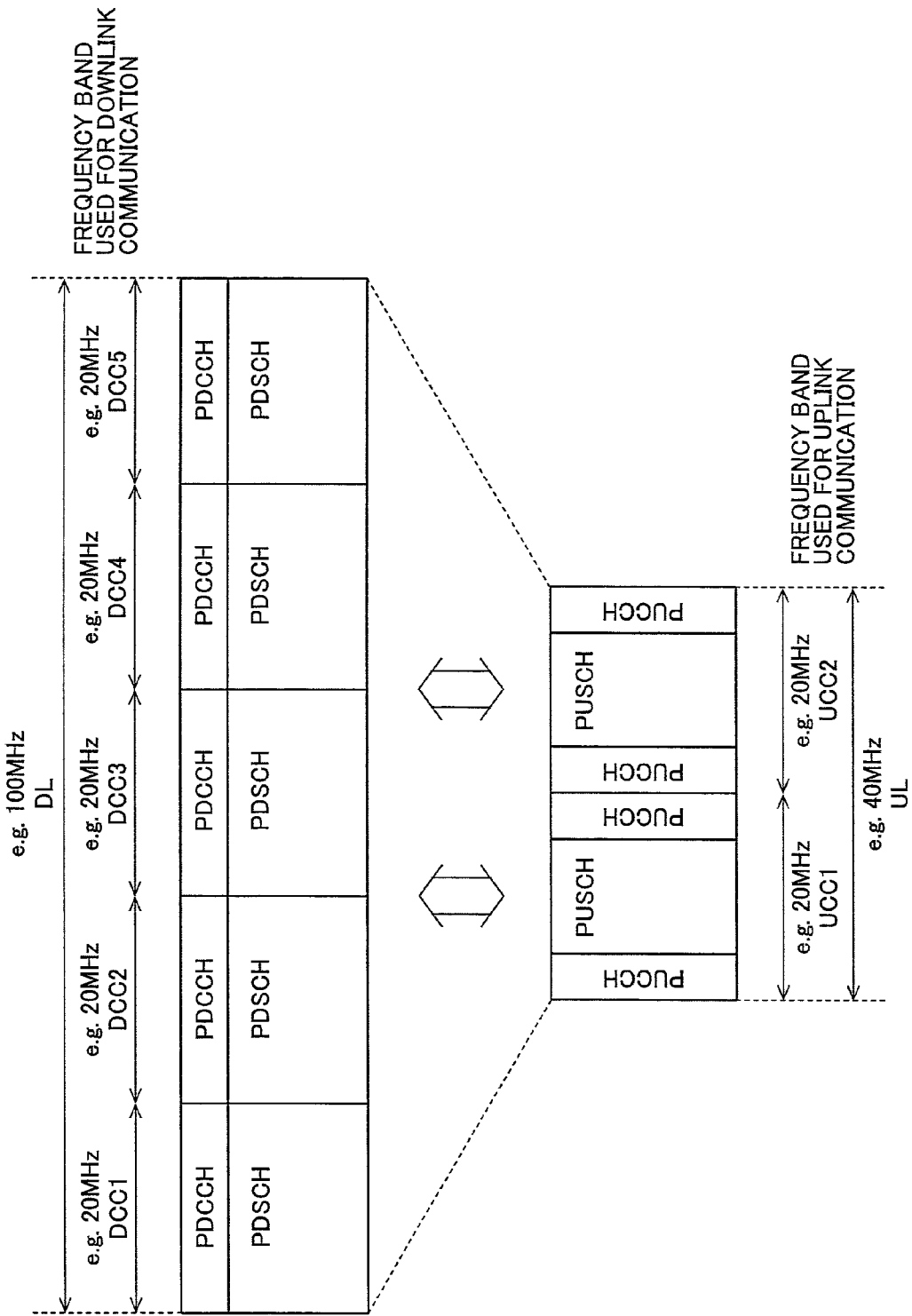
FIG. 18 is a diagram of an example of asymmetric frequency band aggregation in a conventional technique.

FIG. 16 depicts an example when the mobile station apparatus maps the first control information, the second control information, and the uplink data (the UL-SCH) all on the PUSCH allocated by the base station apparatus. In FIG. 16, it is depicted that the first control information (indicated by fine mesh lines), the second control information (indicated by painting black), the uplink data (the UL-SCH) (indicated by painting white), and the pilot signals (the RS) (indicated by vertical lines) are mapped on the PUSCH allocated by the base station apparatus. Although the joint coding is applied to the first control information in this example, the first control information mapped on the PUSCH may be each of the plurality of independent pieces of the first control information.

As depicted in FIG. 16, if the mobile station apparatus maps the first control information, the second control information, and the uplink data (the UL-SCH) on the allocated PUSCH, the mobile station apparatus first maps the first control information by the time-first mapping. The mobile station apparatus then maps the uplink data (the UL-SCH) by the time-first mapping after the first control information is mapped. The mobile station apparatus subsequently maps the second control information adjacently to the RS as depicted in FIG. 16. In this case, the second control information is mapped by overwriting the uplink data (the UL-SCH) (also referred to as mapping the second control information by puncturing the uplink data (the UL-SCH)). Although FIG. 16 depicts, byway of example, that the second control information is mapped on areas available for mapping (four areas adjacent to the RS, i.e., four areas that are third, fifth, tenth, and twelfth areas in increasing order along the time axis among 14 areas in the time axis direction), the areas on which the second control information is mapped (the number of areas where the mobile station apparatus maps the second control information to be transmitted) may be included in the PDCCH (the uplink transmission permission signal) from the base station apparatus and indicated to the mobile station apparatus.

For example, the base station apparatus can include and transmit information of "2" in the PDCCH (the uplink transmission permission signal) as areas where the mobile station apparatus maps the second control information (the number of areas on which the second control information to be transmitted is mapped). The mobile station apparatus receiving this information ensures a size of "2" (e.g., two SC-FDMA symbols) as areas on which the second control information is mapped, mapping the second control information on the ensured areas for transmission to the base station apparatus. For example, if the base station apparatus maps and transmits the HARQ control information (the second control information) for the PDCCH and/or the downlink transport blocks on the allocated PUSCH, the base station apparatus can transmit (specify) the information indicative of the (total) number of the PDCCHs and/or the PDSCHs transmitted in the same sub-frame from the base station apparatus, to the mobile station apparatus. The mobile station apparatus ensures the PUSCH areas in accordance with the information indicative of the (total) number of the PDCCHs and/or the PDSCHs transmitted in the same sub-frame transmitted from the base station apparatus, and maps the second control information on the ensured PUSCH for transmission to the base station apparatus. Since the base station apparatus and the mobile station apparatus transmit/receive the information indicative of the (total) number of the PDCCHs and/or the PDSCHs transmitted in the same sub-frame, flexible control can be implemented for the PUSCH areas where the mobile station apparatus maps the second control information, enabling effective use of the PUSCH areas.

Since the mobile station apparatus maps the second control information adjacent to the RS, deterioration due to channel estimation error in the base station apparatus can be alleviated in accuracy of composition of the second control information, and strong resistance to channel fluctuations can be given. Since the mobile station apparatus maps and transmits to the base station apparatus the first control information, the second control information, and the uplink data (the UL-SCH) all on PUSCH with the predefined mapping method as described above, it is not necessary to receive an indication related to mapping from the base station apparatus and the downlink radio resources can efficiently be used for performing the simultaneous transmission of the control information and the uplink data (the UL-SCH).

As described above, in the mobile communication system including the base station apparatus and the mobile station apparatus using the carrier components in a multiple manner to perform communication in a wider frequency band, when the mobile station apparatus receives from the base station apparatus the transmission permission information that gives indication for transmitting all the control information (the first control information and the second control information) on allocated PUSCH, if the PUSCH is allocated by the base station apparatus, the mobile station apparatus transmits all the control information (the first control information and the second control information) on the allocated PUSCH, thereby performing the simultaneous transmission of the data (information) with the transmission power in the mobile station apparatus suppressed to a lower level. Since the mobile station apparatus maps and transmits all the control information (the first control information and the second control information) on the PUSCH allocated by the base station apparatus, the mobile station apparatus can reduce (limit) the number of uplink channels simultaneously transmitted to the base station apparatus, thereby suppressing the transmission power in the mobile station apparatus to a lower level (the simultaneous transmission with transmission on the PUCCH reduced (limited) enables the mobile station apparatus to suppress the transmission power to a lower level). Since the base station apparatus transmits the transmission permission information that gives indication for transmitting all the control information (the first control information and the second control information) on allocated PUSCH, whether all the control information is mapped and transmitted on PUSCH can be switched in the mobile station apparatus, and more flexible transmission control can be implemented.

The embodiments described above are also applied to integrate circuits/chipsets equipped in the base station apparatus and the mobile station apparatus. In the embodiments described above, a program for implementing the functions in the base station apparatus or the functions in the mobile station apparatus may be recorded in a computer readable recording medium and the program recorded in this recording medium may be read and executed by a computer system to control the base station apparatus or the mobile station apparatus. A "computer system" as used herein is assumed to include OS and hardware such as peripherals.

A "computer readable recording medium" means a portable medium such as a flexible disk, a magnetic optical disk, ROM, or CD-ROM, and a storage device such as a hard disk built into a computer system. A "computer readable recording medium" is assumed to include those dynamically retaining a program for a short time like a network such as the Internet and communication wires when a program is transmitted through a communication line such as a telephone line, and those retaining a program for a certain time like a volatile memory within a computer system acting as a server or a client in such a case. The program may be for the purpose of implementing a portion of the functions and may be a program capable of implementing the functions in combination with a program already recorded in a computer system.

As described in detail above, the present invention can use the following means.

A mobile communication system is a mobile communication system having a mobile station apparatus transmitting a plurality of uplink data in a same sub-frame to a base station apparatus by using a physical uplink shared channel mapped on each of a plurality of carrier components, wherein the base station apparatus allocates a first physical uplink control channel for transmission of first control information by the mobile station apparatus, persistently to the mobile station apparatus by using a radio resource control signal, the base station apparatus allocates a second physical uplink control channel for transmission of second control information by the mobile station apparatus dynamically to the mobile station apparatus in association with a physical downlink control channel, and if the physical uplink shared channel is allocated, the mobile station apparatus transmits the first control information by using the physical uplink shared channel and the second control information by using the second physical uplink control channel, both in the same sub-frame to the base station apparatus.

A mobile communication system is a mobile communication system having a mobile station apparatus transmitting a plurality of uplink data in a same sub-frame to a base station apparatus by using a physical uplink shared channel mapped on each of a plurality of carrier components, wherein the base station apparatus allocates a plurality of first physical uplink control channels for transmission of first control information by the mobile station apparatus in the same sub-frame persistently to the mobile station apparatus by using a radio resource control signal, the base station apparatus allocates a second physical uplink control channel for transmission of second control information by the mobile station apparatus, dynamically to the mobile station apparatus in association with a physical downlink control channel, and if the physical uplink shared channel is allocated, the mobile station apparatus transmits the first control information by using the physical uplink shared channel and the second control information by using the second physical uplink control channel, both in the same sub-frame to the base station apparatus.

A mobile communication system is a mobile communication system having a mobile station apparatus transmitting a plurality of uplink data in a same sub-frame to a base station apparatus by using a physical uplink shared channel mapped on each of a plurality of carrier components, wherein the base station apparatus allocates a plurality of first physical uplink control channels for transmission of each of a plurality of pieces of first control information by the mobile station apparatus, in the same sub-frame persistently to the mobile station apparatus by using a radio resource control signal, the base station apparatus allocates a second physical uplink control channel for transmission of second control information by the mobile station apparatus dynamically to the mobile station apparatus in association with a physical downlink control channel, and if the physical uplink shared channel is allocated, the mobile station apparatus transmits the plurality of pieces of the first control information by using the physical uplink shared channel and the second control information by using the second physical uplink control channel, both in the same sub-frame to the base station apparatus.

The mobile station apparatus maps each of the plurality of pieces of the first control information on the physical uplink shared channel in increasing order of index to perform transmission to the base station apparatus.

The first control information is channel state information indicative of a downlink channel state.

The first control information is a scheduling request that requests resource allocation for transmitting uplink data.

The first control information is the HARQ control information for a downlink transport block transmitted by a resource persistently allocated by the base station apparatus.

The second control information is the HARQ control information for a physical downlink control channel and/or a downlink transport block.

The second control information is the HARQ control information for a physical downlink control channel and/or a downlink transport block transmitted by a resource dynamically allocated by the base station apparatus.

The second control information is the HARQ control information for a downlink transport block transmitted by a resource persistently allocated by the base station apparatus.

A mobile station apparatus is a mobile station apparatus transmitting a plurality of uplink data in a same sub-frame to a base station apparatus by using a physical uplink shared channel mapped on each of a plurality of carrier components, comprising: a means for receiving from the base station apparatus a radio resource control signal that persistently allocates a first physical uplink control channel for transmitting first control information; a means for receiving from the base station apparatus a physical downlink control channel associated with a second physical uplink control channel, the physical downlink control channel dynamically allocating a second physical uplink control channel for transmitting second control information; and a means for transmitting the first control information by using the physical uplink shared channel and the second control information by using the second physical uplink control channel, both in the same sub-frame to the base station apparatus if the physical uplink shared channel is allocated by the base station apparatus.

A mobile station apparatus is a mobile station apparatus transmitting a plurality of uplink data in a same sub-frame to a base station apparatus by using a physical uplink shared channel mapped on each of a plurality of carrier components, comprising: a means for receiving from the base station apparatus a radio resource control signal that persistently allocates in a same sub-frame a plurality of first physical uplink control channels for transmitting first control information; a means for receiving from the base station apparatus a physical downlink control channel associated with a second physical uplink control channel, the physical downlink control channel dynamically allocating a second physical uplink control channel for transmitting second control information; and a means for transmitting the first control information by using the physical uplink shared channel and the second control information by using the second physical uplink control channel, both in the same sub-frame to the base station apparatus if the physical uplink shared channel is allocated by the base station apparatus.

A mobile station apparatus is a mobile station apparatus transmitting a plurality of uplink data in a same sub-frame to a base station apparatus by using a physical uplink shared channel mapped on each of a plurality of carrier components, comprising: a means for receiving from the base station apparatus a radio resource control signal that persistently allocates in a same sub-frame a plurality of first physical uplink control channels for transmitting each of a plurality of pieces of first control information; a means for receiving from the base station apparatus a physical downlink control channel associated with a second physical uplink control channel, the physical downlink control channel dynamically allocating a second physical uplink control channel for transmitting second control information; and a means for transmitting the plurality of pieces of the first control information by using the physical uplink shared channel and the second control information by using the second physical uplink control channel, both in the same sub-frame to the base station apparatus if the physical uplink shared channel is allocated by the base station apparatus.

The mobile station apparatus maps each of the plurality of pieces of the first control information on the physical uplink shared channel in increasing order of index to perform transmission to the base station apparatus.

A mobile communication method is a communication method in a mobile station apparatus transmitting a plurality of uplink data in a same sub-frame to a base station apparatus by using a physical uplink shared channel mapped on each of a plurality of carrier components, comprising: receiving from the base station apparatus a radio resource control signal that persistently allocates a first physical uplink control channel for transmitting first control information; receiving from the base station apparatus a physical downlink control channel associated with a second physical uplink control channel, the physical downlink control channel dynamically allocating a second physical uplink control channel for transmitting second control information; and transmitting the first control information by using the physical uplink shared channel and the second control information by using the second physical uplink control channel, both in the same sub-frame to the base station apparatus if the physical uplink shared channel is allocated by the base station apparatus.

A mobile communication method is a communication method in a mobile station apparatus transmitting a plurality of uplink data in a same sub-frame to a base station apparatus by using a physical uplink shared channel mapped on each of a plurality of carrier components, comprising: receiving from the base station apparatus a radio resource control signal that persistently allocates in a same sub-frame a plurality of first physical uplink control channels for transmitting first control information; receiving from the base station apparatus a physical downlink control channel associated with a second physical uplink control channel, the physical downlink control channel dynamically allocating a second physical uplink control channel for transmitting second control information; and transmitting the first control information by using the physical uplink shared channel and the second control information by using the second physical uplink control channel, both in the same sub-frame to the base station apparatus if the physical uplink shared channel is allocated by the base station apparatus.

A mobile communication method is a communication method in a mobile station apparatus transmitting a plurality of uplink data in a same sub-frame to a base station apparatus by using a physical uplink shared channel mapped on each of a plurality of carrier components, comprising: receiving from the base station apparatus a radio resource control signal that persistently allocates in a same sub-frame a plurality of first physical uplink control channels for transmitting each of a plurality of pieces of first control information; receiving from the base station apparatus a physical downlink control channel associated with a second physical uplink control channel, the physical downlink control channel dynamically allocating a second physical uplink control channel for transmitting second control information; and transmitting the plurality of pieces of the first control information by using the physical uplink shared channel and the second control information by using the second physical uplink control channel, both in the same sub-frame to the base station apparatus if the physical uplink shared channel is allocated by the base station apparatus.

The mobile station apparatus maps each of the plurality of pieces of the first control information on the physical uplink shared channel in increasing order of index to perform transmission to the base station apparatus.

Although the embodiments of the present invention have been described in detail with reference to the drawings, specific configurations are not limited to the embodiments and the claims include designs etc., within a range not departing from the spirit of the present invention.

EXPLANATIONS OF LETTERS OR NUMERALS

100 . . . base station apparatus; 101 . . . data control portion; 102 . . . transmission data modulating portion; 103 . . . radio portion; 104 . . . scheduling portion; 105 . . . channel estimating portion; 106 . . . reception data demodulating portion; 107 . . . data extracting portion; 108 . . . higher layer; 109 . . . antenna; 110 . . . radio resource control portion; 200 . . . mobile station apparatus; 201 . . . data control portion; 202 . . . transmission data modulating portion; 203 . . . radio portion; 204 . . . scheduling portion; 205 . . . channel estimating portion; 206 . . . reception data demodulating portion; 207 . . . data extracting portion; 208 . . . higher layer; 209 . . . antenna; and 210 . . . radio resource control portion.

The invention claimed is:

1. A mobile station apparatus configured to communicate with a base station apparatus using a plurality of downlink component carriers, the mobile station apparatus comprising:
   receiving circuitry configured to
      receive, from the base station apparatus, a radio resource control signal including first information used for configuring a first physical uplink control channel resource, the first physical uplink control channel resource being used for transmission of channel state information, and
      receive, from the base station apparatus, a physical downlink control channel used for indicating a second physical uplink control channel resource, the second physical uplink control channel resource being used for transmission of HARQ (Hybrid Automatic Repeat Request) control information, and
   transmitting circuitry configured to
      transmit in a first subframe, to the base station apparatus, the channel state information using the first physical uplink control channel resource, and transmit in a second subframe, to the base station apparatus, the HARQ control information using the second physical uplink control channel resource, wherein in a case that transmission of the channel state information and transmission of the HARQ control information collide in a third subframe, the transmitting circuitry is configured to transmit in the third subframe, to the base station apparatus, the channel state information and the HARQ control information using the second physical uplink control channel resource, the second physical uplink control channel resource being indicated by using the physical downlink control channel.

2. The mobile station apparatus according to claim 1, wherein the channel state information and the HARQ control information transmitted using the second physical uplink control channel resource are jointly coded.

3. A base station apparatus configured to communicate with a mobile station apparatus using a plurality of downlink component carriers, the base station apparatus comprising:

transmitting circuitry configured to transmit, to the mobile station apparatus, a radio resource control signal including first information used for configuring a first physical uplink control channel resource, the first physical uplink control channel resource being used for transmission of channel state information, and transmit, to the mobile station apparatus, a physical downlink control channel used for indicating a second physical uplink control channel resource, the second physical uplink control channel resource being used for transmission of HARQ (Hybrid Automatic Repeat Request) control information, and receiving circuitry configured to receive in a first subframe, from the mobile station apparatus, the channel state information using the first physical uplink control channel resource, and receive in a second subframe, from the mobile station apparatus, the HARQ control information using the second physical uplink control channel resource, wherein in a case that reception of the channel state information and reception of the HARQ control information collide in a third subframe, the receiving circuitry is configured to receive in the third subframe, the channel state information and the HARQ control information using the second physical uplink control channel resource, the second physical uplink control channel resource being indicated by using the physical downlink control channel.

4. The base station apparatus according to claim 3, wherein the channel state information and the HARQ control information transmitted using the second physical uplink control channel resource are jointly coded.

5. A communication method of a mobile station apparatus configured to communicate with a base station apparatus using a plurality of downlink component carriers, the communication method comprising:

receiving, from the base station apparatus, a radio resource control signal including first information used for configuring a first physical uplink control channel resource, the first physical uplink control channel resource being used for transmission of channel state information, receiving, from the base station apparatus, a physical downlink control channel used for indicating a second physical uplink control channel resource, the second physical uplink control channel resource being used for transmission of HARQ (Hybrid Automatic Repeat Request) control information, transmitting in a first subframe, to the base station apparatus, the channel state information using the first physical uplink control channel resource, transmitting in a second subframe, to the base station apparatus, the HARQ control information using the second physical uplink control channel resource, and in a case that transmission of the channel state information and transmission of the HARQ control information collide in a third subframe, transmitting in the third subframe, to the base station apparatus, the channel state information and the HARQ control information using the second physical uplink control channel resource, the second physical uplink control channel resource being indicated by using the physical downlink control channel.

6. A communication method of a base station apparatus configured to communicate with a mobile station apparatus using a plurality of downlink component carriers, the communication method comprising:

transmitting, to the mobile station apparatus, a radio resource control signal including first information used for configuring a first physical uplink control channel resource, the first physical uplink control channel resource being used for transmission of channel state information, transmitting, to the mobile station apparatus, a physical downlink control channel used for indicating a second physical uplink control channel resource, the second physical uplink control channel resource being used for transmission of HARQ (Hybrid Automatic Repeat Request) control information, receiving in a first subframe, from the mobile station apparatus, the channel state information using the first physical uplink control channel resource, receiving in a second subframe, from the mobile station apparatus, the HARQ control information using the second physical uplink control channel resource, and in a case that reception of the channel state information and reception of the HARQ control information collide in a third subframe, receiving in the third subframe, the channel state information and the HARQ control information using the second physical uplink control channel resource, the second physical uplink control channel resource being indicated by using the physical downlink control channel.

* * * * *